United States Patent
Karafin et al.

(10) Patent No.: US 12,210,723 B2
(45) Date of Patent: *Jan. 28, 2025

(54) LIGHT FIELD DISPLAY SYSTEM FOR CONSUMER DEVICES

(71) Applicant: Light Field Lab, Inc., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/636,549

(22) PCT Filed: Aug. 19, 2019

(86) PCT No.: PCT/US2019/047107
§ 371 (c)(1),
(2) Date: Feb. 18, 2022

(87) PCT Pub. No.: WO2021/034315
PCT Pub. Date: Feb. 25, 2021

(65) Prior Publication Data
US 2022/0300143 A1 Sep. 22, 2022

(51) Int. Cl.
*G06F 3/04815* (2022.01)
*G03H 1/00* (2006.01)
(Continued)

(52) U.S. Cl.
CPC ....... *G06F 3/04815* (2013.01); *G03H 1/0005* (2013.01); *G06F 3/016* (2013.01);
(Continued)

(58) Field of Classification Search
CPC .... G06F 3/04815; G06F 3/016; G06F 3/0484; G06F 3/167; G06F 21/31; G06F 3/013;
(Continued)

(56) References Cited

U.S. PATENT DOCUMENTS

| | | |
|---|---|---|
| 5,374,976 A | 12/1994 | Spannenburg |
| 8,149,265 B2 | 4/2012 | Smalley et al. |

(Continued)

FOREIGN PATENT DOCUMENTS

| | | |
|---|---|---|
| CN | 102231044 A | 11/2011 |
| CN | 102591124 A | 7/2012 |

(Continued)

OTHER PUBLICATIONS

David Blinder, Tobias Birnbaum, Tomoyoshi Ito, Tomoyoshi Shimobaba. The state-of-the-art in computer generated holography for 3D display[J]. Light: Advanced Manufacturing 3, 35(2022). doi: 10.37188/lam.2022.035 (Year: 2022).*

(Continued)

*Primary Examiner* — James T Tsai

(57) ABSTRACT

A light field display system is implemented in a consumer device to present the user of the consumer device with holographic content, providing the user with an immersive operational experience. The system generates and presents holographic content for the user. The system receives a command from the user. In some embodiments, the presented holographic content may comprise a holographic user interface that is used by the system to receive the commands from the user. Subsequently, the system recognizes the received commands, determines one or more computational commands for execution by the system, and executes the determined computational command.

14 Claims, 13 Drawing Sheets

(51) Int. Cl.
*G06F 3/01* (2006.01)
*G06F 3/0484* (2022.01)
*G06F 3/16* (2006.01)
*G06F 21/31* (2013.01)
*H04L 67/306* (2022.01)

(52) U.S. Cl.
CPC ............ *G06F 3/0484* (2013.01); *G06F 3/167* (2013.01); *G06F 21/31* (2013.01); *H04L 67/306* (2013.01); *G03H 2001/0061* (2013.01); *G06F 3/013* (2013.01); *G06F 3/017* (2013.01)

(58) Field of Classification Search
CPC ................ G06F 3/017; G03H 1/0005; G03H 2001/0061; H04L 67/306
See application file for complete search history.

(56) References Cited

U.S. PATENT DOCUMENTS

| | | | |
|---|---|---|---|
| 8,212,768 B2* | 7/2012 | Fein | G03H 1/0005 715/848 |
| 10,432,919 B2 | 10/2019 | Lapstun | |
| 10,560,689 B2 | 2/2020 | Lapstun | |
| 2003/0222977 A1 | 12/2003 | Yoshino | |
| 2006/0028400 A1 | 2/2006 | Lapstun et al. | |
| 2008/0144174 A1 | 6/2008 | Lucente et al. | |
| 2008/0170293 A1 | 7/2008 | Lucente et al. | |
| 2009/0040294 A1 | 2/2009 | Smalley et al. | |
| 2011/0012895 A1 | 1/2011 | Lucente et al. | |
| 2011/0202553 A1* | 8/2011 | Salemann | G06F 3/04815 707/769 |
| 2012/0090005 A1* | 4/2012 | Marlow | H04N 5/74 348/E13.001 |
| 2012/0313839 A1 | 12/2012 | Smithwick et al. | |
| 2013/0069933 A1 | 3/2013 | Smithwick et al. | |
| 2013/0076930 A1 | 3/2013 | Border et al. | |
| 2013/0163089 A1 | 6/2013 | Bohn | |
| 2013/0195410 A1 | 8/2013 | Karbasivalashani et al. | |
| 2013/0265485 A1 | 10/2013 | Kang | |
| 2014/0035959 A1 | 2/2014 | Lapstun | |
| 2014/0125574 A1 | 5/2014 | Scavezze et al. | |
| 2014/0132694 A1 | 5/2014 | Shacham et al. | |
| 2014/0184496 A1 | 7/2014 | Gribetz et al. | |
| 2014/0192087 A1 | 7/2014 | Frost | |
| 2014/0293385 A1 | 10/2014 | Smithwick | |
| 2014/0300694 A1 | 10/2014 | Smalley et al. | |
| 2014/0300695 A1 | 10/2014 | Smalley et al. | |
| 2015/0000025 A1* | 1/2015 | Clements | G06F 3/041 4/443 |
| 2015/0121287 A1* | 4/2015 | Fermon | G06F 3/0304 715/773 |
| 2015/0201186 A1 | 7/2015 | Smithwick | |
| 2015/0277378 A1 | 10/2015 | Smithwick et al. | |
| 2016/0139402 A1 | 5/2016 | Lapstun | |
| 2016/0170372 A1 | 6/2016 | Smithwick | |
| 2016/0274539 A1 | 9/2016 | Smithwick | |
| 2016/0282614 A1 | 9/2016 | Zagolla et al. | |
| 2016/0282808 A1 | 9/2016 | Smalley | |
| 2016/0364003 A1* | 12/2016 | O'Brien | G03H 1/0005 |
| 2017/0214907 A1 | 7/2017 | Lapstun | |
| 2017/0289530 A1 | 10/2017 | Smithwick et al. | |
| 2017/0344222 A1 | 11/2017 | Katz | |
| 2018/0063519 A1 | 3/2018 | Smithwick et al. | |
| 2018/0084245 A1 | 3/2018 | Lapstun | |
| 2018/0157398 A1 | 6/2018 | Kaehler et al. | |
| 2018/0225860 A1 | 8/2018 | Conness et al. | |
| 2019/0033780 A1 | 1/2019 | Bharti et al. | |
| 2019/0156715 A1* | 5/2019 | James | G06F 3/017 |
| 2019/0259320 A1 | 8/2019 | Lapstun | |
| 2020/0368616 A1* | 11/2020 | Delamont | G06F 3/011 |

FOREIGN PATENT DOCUMENTS

| | | | |
|---|---|---|---|
| CN | 103616770 A | 3/2014 | |
| CN | 103777455 A | 5/2014 | |
| CN | 103959179 A | 7/2014 | |
| CN | 105334690 A | 2/2016 | |
| CN | 107924299 A | 4/2018 | |
| JP | 2002092790 A | 3/2002 | |
| JP | 2006145988 A | 6/2006 | |
| JP | 2009530661 A | 8/2009 | |
| JP | 2018014575 A | 1/2018 | |
| JP | 2020513618 A | 5/2020 | |
| KR | 20040036722 A | 4/2004 | |
| KR | 20190053839 A | 5/2019 | |
| WO | 2008048360 A2 | 4/2008 | |
| WO | 2016189390 A2 | 12/2016 | |
| WO | 2017127897 A1 | 8/2017 | |
| WO | 2018106542 A1 | 6/2018 | |
| WO | 2019140348 A2 | 7/2019 | |

OTHER PUBLICATIONS

EP-19942261.9 European Extended Search Report of European Patent Office dated Apr. 3, 2023.
Matsubayashi et al: "Direct Finger Manipulation of 3D Object Image with Ultrasound Haptic Feedback", Human Factors in Computing Systems, ACM, 2 Penn Plaza, Suite 701New YorkNY10121-0701USA, May 2, 2019 (May 2, 2019), pp. 1-11.
International Search Report and Written Opinion of PCT/US2019/047107 dated Nov. 6, 2019.
AU-2017297629 Notice of Acceptance dated Jul. 26, 2018.
AU-2018256628 Examination Report No. 1 dated Jul. 1, 2019.
CN201780043946.8 First Office Action of the Chinese Patent Office mailed Dec. 22, 2020.
CN201780043946.8 Second Office Action of the Chinese Patent Office mailed Sep. 15, 2021.
EA-201892637 Office Action of the Eurasian Patent Office dated Mar. 6, 2020.
EA-202193101 Notification of the Search Report of the Eurasian Patent Office dated Sep. 16, 2022.
EP-17828632.4 European Partial Search Report of European Patent Office dated Feb. 10, 2020.
International Search Report and Written Opinion of PCT/US2017/042470 dated Dec. 28, 2017.
NZ-743813 First Examination Report dated Sep. 14, 2018.
Blinder, et al., The state-of-the-art in computer generated holography for 3D display(J), Light: Advanced Manufacturing 3, 35 (2022). doi: 10.37188/lam.2022.035 (Year: 2022).
JP2022-510867 Non-Final Notice of Reasons for Rejection of the Japan Patent Office dated Sep. 5, 2023.
KR-10-2022-7009072 Notice of Preliminary Rejection mailed May 30, 2024.
CN2019801004833 First Office Action of the Chinese Patent Office mailed Apr. 1, 2024.

* cited by examiner

LIGHT FIELD DISPLAY SYSTEM FOR CONSUMER DEVICES

CROSS REFERENCE TO RELATED APPLICATIONS

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates to consumer devices such as ovens, refrigerators, stoves, washing machines, dryers, home assistants (e.g. Alexa™ from Amazon) and dishwashers, and specifically to light field displays in consumer devices.

Conventional consumer devices (also referred to herein as appliances) generally rely on two-dimensional (2D) visual displays for user interfaces. A 2D display screen on an appliance is designed to provide an interactive display for displaying the range of functionalities offered by the appliance to the user, and allowing the user to select and configure a desired functionality. However, such 2D visual display are limited due to the footprint that they occupy on the appliance surface. Consequently, the display content is also limited to the 2D visual display, which limits the viewing experience that may be provided to the appliance user. In particular, 2D visual displays offers limited opportunities to provide the user with an immersive operational experience.

The described embodiments relate to techniques involving light field display systems in consumer devices that provide a user with an immersive operational experience while using the devices.

SUMMARY

A light field (LF) display system in a consumer device generates holographic content for viewing by a user of the consumer device. The generated holographic content may be a holographic user interface that is displayed to the user of the consumer device. The light field display system may receive a command from the user. The LF display system determines a computational command based on the received user command, and executes the determined computational command appropriately. In some embodiments, the holographic content is augmented with a tactile surface on the generated holographic content. The tactile surface may provide a sensation of touch to the user. The light field system in the consumer device may display a holographic image of an object that resides within the consumer device, receive information about the object, and may modify the displayed holographic content based on the received information.

In some embodiments, the consumer device comprises an LF display system that comprises a controller configured to generate holographic content, an LF display assembly, and a command interface. The LF display assembly comprises one or more LF display modules that are configured to present the holographic content in a holographic object volume to one or more users of a consumer device located in a viewing volume of the one or more LF display modules.

In some embodiments, the LF display system includes a tracking system and/or a viewer profiling module. The tracking system and viewer profiling module can monitor and store characteristics of users of the consumer device, a user profile describing a user, and/or responses of users to the holographic content presented during the operation of the consumer device. The holographic content may be created for display based on any of the monitored or stored information.

In some embodiments, a user of the consumer device may interact with the holographic content, and the interaction can act as input for the holographic content creation system. For example, in some embodiments, some or all of the LF display system includes one or more ultrasonic speakers. The plurality of ultrasonic speakers may be configured to generate a haptic surface that coincides with at least a portion of the holographic content. The tracking system is configured to track an interaction of a user with the holographic object (e.g., via images captured by imaging sensors of the LF display modules and/or some other cameras). And the LF display system is configured to provide to create holographic content based on the interaction

DETAILED DESCRIPTION

Overview

Figure 1:
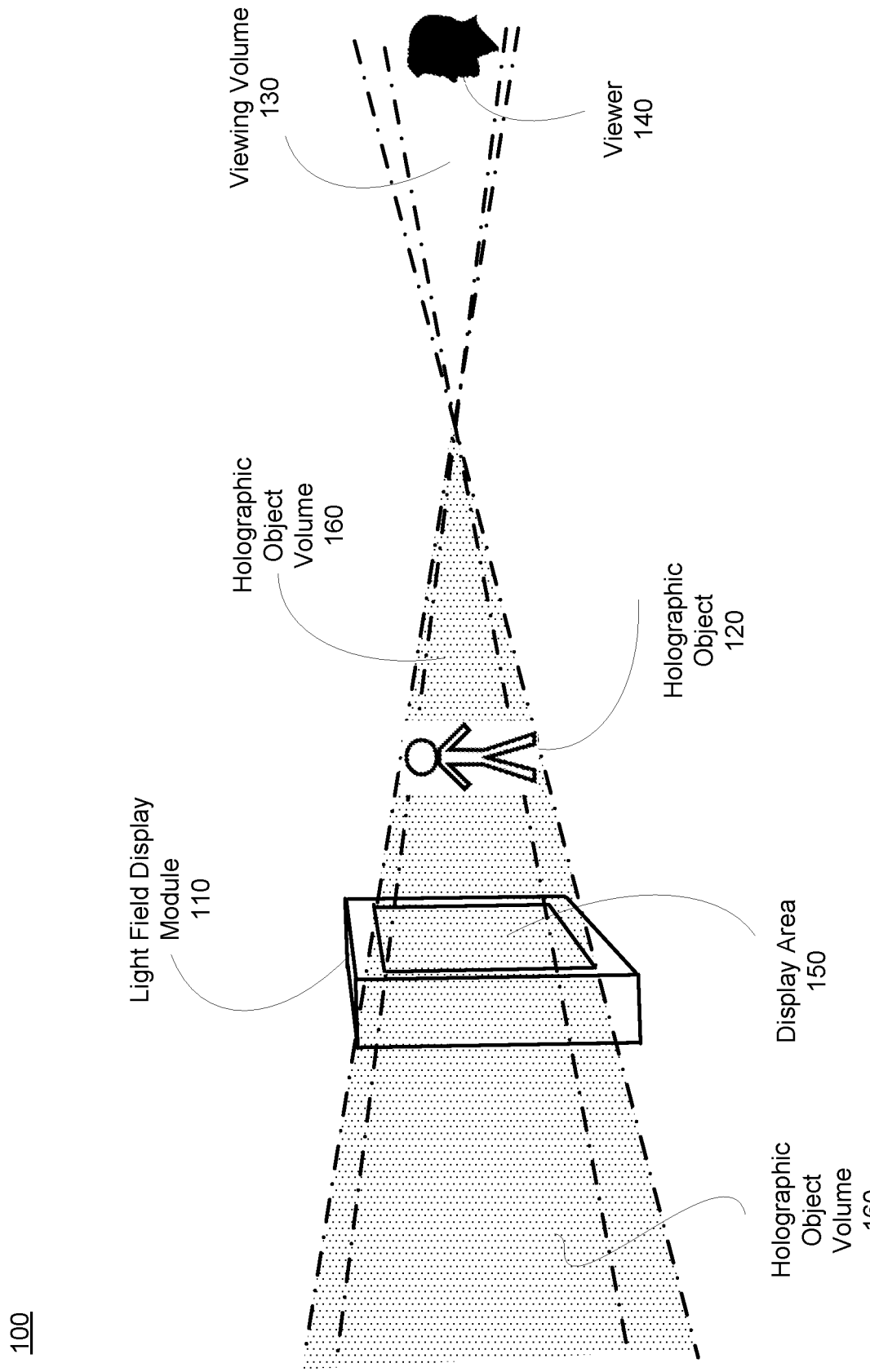
FIG. 1 is a diagram of a light field display module presenting a holographic object, in accordance with one or more embodiments.

A light field (LF) display system is implemented in a consumer device to present an appliance user with holographic content which includes at least one holographic object. The terms "user," "appliance user," and "viewer" are used interchangeably herein. The terms "appliance," "consumer appliance," "consumer appliance device," "consumer device," and "device" are also used interchangeably herein, and the terms refer to electrical/mechanical machines that accomplish household tasks such as cleaning, cooking, and food preservation, as well as home assistants (e.g. Amazon Alexa™ or Google Home™). Examples include consumer devices such as refrigerators, stoves, washing machines, dryers, and dishwashers, roti-makers, pressure cookers, etc.

The LF display system in an appliance is integrated with appliance functionality in order to provide the appliance user with an immersive operational experience while using the appliance. Appliance functionality is enabled using mechanical and electronic control systems, where the electronic control systems may be enabled by executing computer program modules, including a variety of software client applications, using which, an appliance user is able to operate the appliance. The LF display system comprises a LF display module configured to present holographic content including one or more holographic objects that would be visible to the viewer in a viewing volume of the appliance. The holographic content presented by the LF display system is integrated with the appliance functionalities; this increases the immersive experience of the appliance user while operating the appliance. A holographic object may also be augmented with other sensory stimuli (e.g., tactile, acoustic, temperature, or olfactory). For example, ultrasonic emitters in the LF display system may project ultrasonic pressure waves that create a volumetric haptic projection. The volumetric haptic projection provides a tactile surface that corresponds to some or all of the projected holographic objects. Holographic content may include additional visual content (i.e., 2D or 3D visual content). The coordination of energy sources that enables a cohesive experience is part of the LF system in implementations with multiple energy sources (i.e., holographic objects providing the correct haptic feel and sensory stimuli at any given point in time). For example, a LF system may include a controller to coordinate presentation of holographic content and one or more haptic surfaces.

In some embodiments, the LF display system may include elements that enable the system to project at least one type of energy, and, simultaneously, sense at least one type of energy for the purpose of responding to the user and creating an interactive experience. Sensed energy may be used for recording how a user responds to the holographic content. For example, a LF display system can project both holographic objects for viewing as well as ultrasonic waves for haptic perception, and simultaneously record imaging information for tracking of the user and other scene analysis, while also sensing ultrasonic waves to detect touch response by the user. As an example, such a system may project a holographic object, which when virtually "touched" by a user, modifies its "behavior" in accordance with the touch stimuli. The display system components that perform energy sensing of the environment may be integrated into the display surface, or they may be dedicated sensors that are separate from the display surface, such as ultrasonic speakers and imaging capture devices such as cameras.

The LF display system may be constructed to provide various experiences with consumer devices based on the holographic objects generated. For example, in one embodiment, an LF display system on a refrigerator may be implemented to present to the user, a holographic view of an inner refrigerator shelf contents through a viewing application. The LF display assembly may form a single-sided or a multi-sided seamless surface environment. Holographic content may augment or enhance physical objects, such as the appliance display screen itself. For example, in one embodiment, the LF display system on a device may be implemented to present a holographic sign, for example, "Cake Baking: Time to Finish: 12 minutes" on the exterior surface of the oven. Moreover, the user can freely view the holographic content without need of eyewear devices such as 3D glasses or any other head gear.

In some embodiments, the LF display system may receive input through a tracking system and/or a sensory feedback assembly. Based on the input, the LF display system can adjust the holographic content as well as provide feedback to related components.

The LF display system may also incorporate a system for tracking movement of the user at least within the viewing volume of the LF display system. The tracked movement of the user can be used to enhance the experience of the user in using the appliance. For example, the LF display system can use the tracking information to facilitate user interactions with the holographic content (e.g., pushing a holographic button). The LF display system can use the tracked information to monitor finger location relative to a holographic object. For example, the holographic object may be a button that can be "pushed" by a user. The LF display system can project ultrasonic energy to generate a tactile surface that corresponds to the button and occupies substantially the same space as the button. The LF display system can use the tracking information to dynamically move the location of the tactile surface along with dynamically moving the button as it is "pushed" by the user. The LF display system may use the tracking information to render a holographic object that looks at and/or make eye contact, or interacts in other ways with the user. The LF display system may use the tracking information to render a holographic object that "touches" the user, where ultrasonic speakers create a tactile surface by which the holographic object can interact, via touch, with the user.

Additionally, the LF display system may incorporate a user profiling system for identifying each user so as to provide personalized content to each appliance user. The user profiling system may further record other information on the user's specific usage of the appliance which can be used on a subsequent use for personalizing holographic content.

Light Field Display System Overview

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple users. In some embodiments, the LF display system may also augment the holographic content with other sensory content (e.g., touch, audio, smell, or temperature). For example, as discussed below, the projection of ultrasonic sound waves may generate a mid-air tactile sensation that can simulate a surface of some or all of a holographic object. The LF display system includes one or more LF display modules 110, and is discussed in detail below with regard to FIGS. 2-8

The LF display module 110 is a holographic display that presents holographic objects (e.g., the holographic object 120) to one or more users (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in detail below with regard to FIGS. 2-3.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic object 120 can be placed anywhere within the holographic object volume 160. The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the display surface 150 (i.e., towards the viewer 140), such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within the viewing volume 130, such that they are indistinguishable from actual objects. A holographic object is formed by projecting the same light rays that would be generated from the surface of the object were it physically present. And unlike a stereoscopic display, a viewed position of the converged energy propagation paths in the holographic object volume 160 does not vary as a viewer 140 moves around the viewing volume 130 (e.g., as discussed below with regard to FIG. 2). Instead, two people located in the holographic viewing volume 130 will see the appropriate views of the object as if were actually there. Accordingly, the viewer 140 may be unconstrained within the viewing volume. In contrast, conventional systems often require that a viewer be constrained (e.g., in a chair that has fixed location relative to the display) to a particular field of view.

In some cases, the holographic object volume 160 and the corresponding viewing volume 130 may be relatively small—such that it is designed for a single viewer. In other embodiments, as discussed in detail below with regard to, e.g., FIGS. 4A and 4B, the LF display modules may be enlarged and/or tiled to create larger holographic object volumes and corresponding viewing volumes that can accommodate a large range of viewers (e.g., one to thousands). The LF display modules presented in this disclosure are built so that the full surface of the module contains holographic imaging optics, with no inactive or dead space, without any need for bezels. In these embodiments, the LF display modules may be tiled so that the imaging area is continuous across the seam of the tile between LF display modules, and the bond line between the tiled modules is virtually undetectable using the visual acuity of the eye.

The flexible size and/or shape of the viewing volume 130 allows for viewers to be unconstrained within the viewing volume 130. For example, the viewer 140 can move to a different position within the viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a holographic character that may be a simulated avatar that interacts with the user. The viewer 140 may move to other locations relative to the holographic object 120 to see different views of the character. For example, the viewer 140 may move such that he/she sees a left side of the character, a right side of the character, etc., much like if the viewer 140 was looking at an actual person and changed his/her relative position to the actual person to see different aspects of the person. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface that has an effective display area that is larger than the display areas of the individual LF display modules. Some embodiments relating to tiling LF display modules are discussed below with regard to FIGS. 4A and 4B. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content that appears behind the plane of the display area 150. For example, the LF display module 110 may make the display area 150 appear to be a room that the holographic object 120 is within. The displayed content may be such that the viewer 140 is able to look through the displayed surface to see other objects in the room. Moreover, the LF display system can generate content that seamlessly moves around the holographic object volume 160, including behind and in front of the plane of the display surface 150.

Figure 2A:
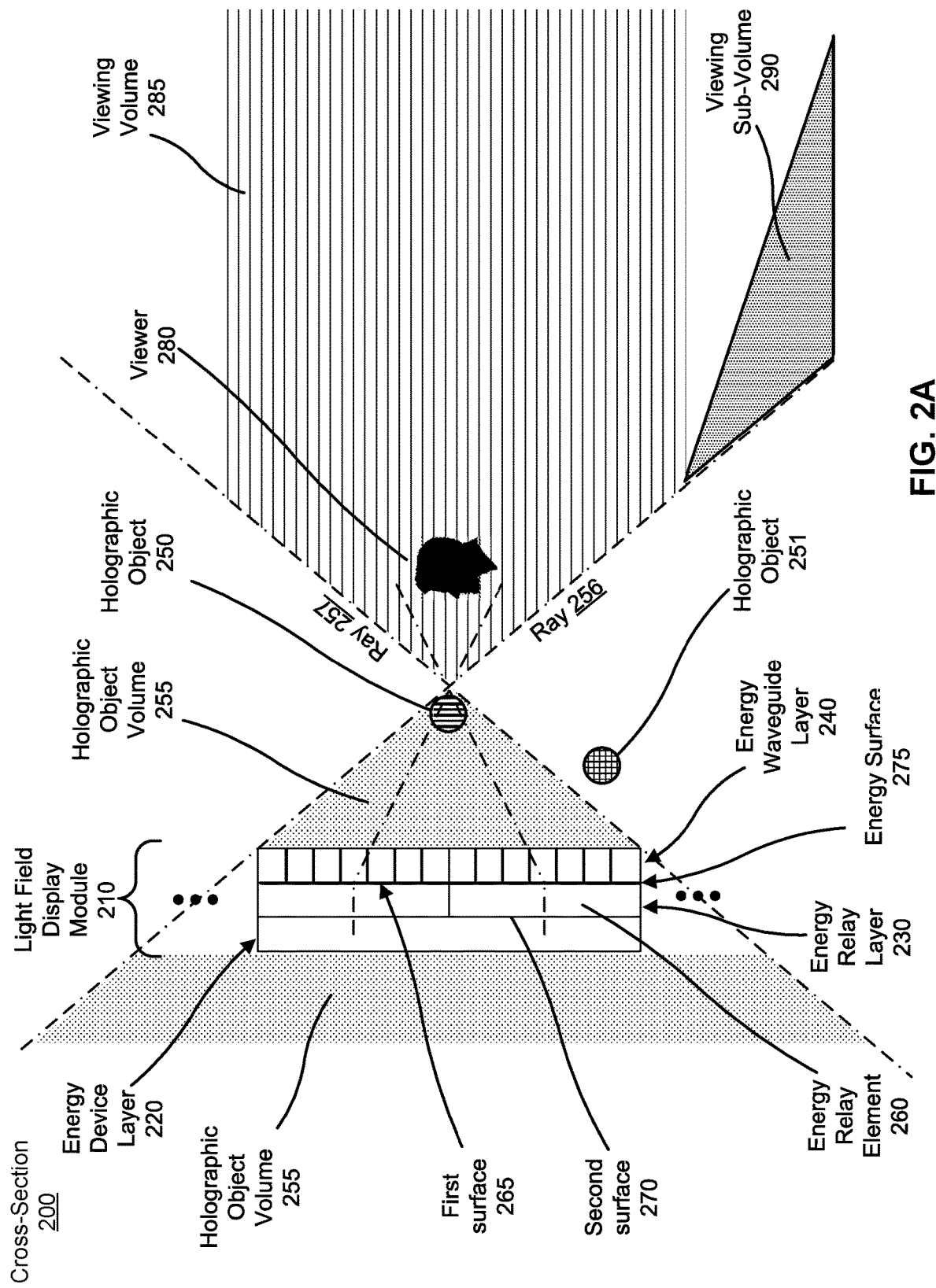
FIG. 2A is a cross section of a portion of a light field display module, in accordance with one or more embodiments.

FIG. 2A is a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. The directed energy from the display surface enables convergence of many rays of energy, which, thereby, can be create virtual objects. For visible light, for example, the LF display will project a very large number of light rays to converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given virtual object, and the viewer will see a different view of that virtual object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic emitting device generates one or more pressure waves that complement the holographic object 250. The generated pressure waves may be, e.g., audible, ultrasonic, or some combination thereof. An ultrasonic pressure wave that is used for volumetric tactile sensation (e.g., at a surface of the holographic object 250). An audible pressure wave is used for providing audio content (e.g., immersive audio) that can complement the holographic object 250. For example, assuming the holographic object 250 is a character, one or more acoustic projection devices may be used to (1) generate a tactile surface that is collocated with a surface of the presented character such that viewers may touch the holographic object 250; and/or (2) provide audio content corresponding to perhaps a vocal greeting from the character. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor is at least sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

The energy relay layer 230 relays energy (e.g., electromagnetic, mechanical pressure waves) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having better than 20/40 vision, such that the energy surface 275 is effectively seamless from the perspective of a viewer 280 within a viewing volume 285.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiency relayed between these surfaces without any significant loss in resolution.

The energy waveguide layer 240 directs energy from a location (e.g., a coordinate) on the energy surface 275 into a specific propagation path outward from the display surface into the holographic viewing volume 285 using waveguide elements in the energy waveguide layer 240. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

The energy waveguide layer 240 directs energy from a location (e.g., a coordinate) on the energy surface 275 into a specific propagation path outward from the display surface into the holographic viewing volume 285 using waveguide elements in the energy waveguide layer 240. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
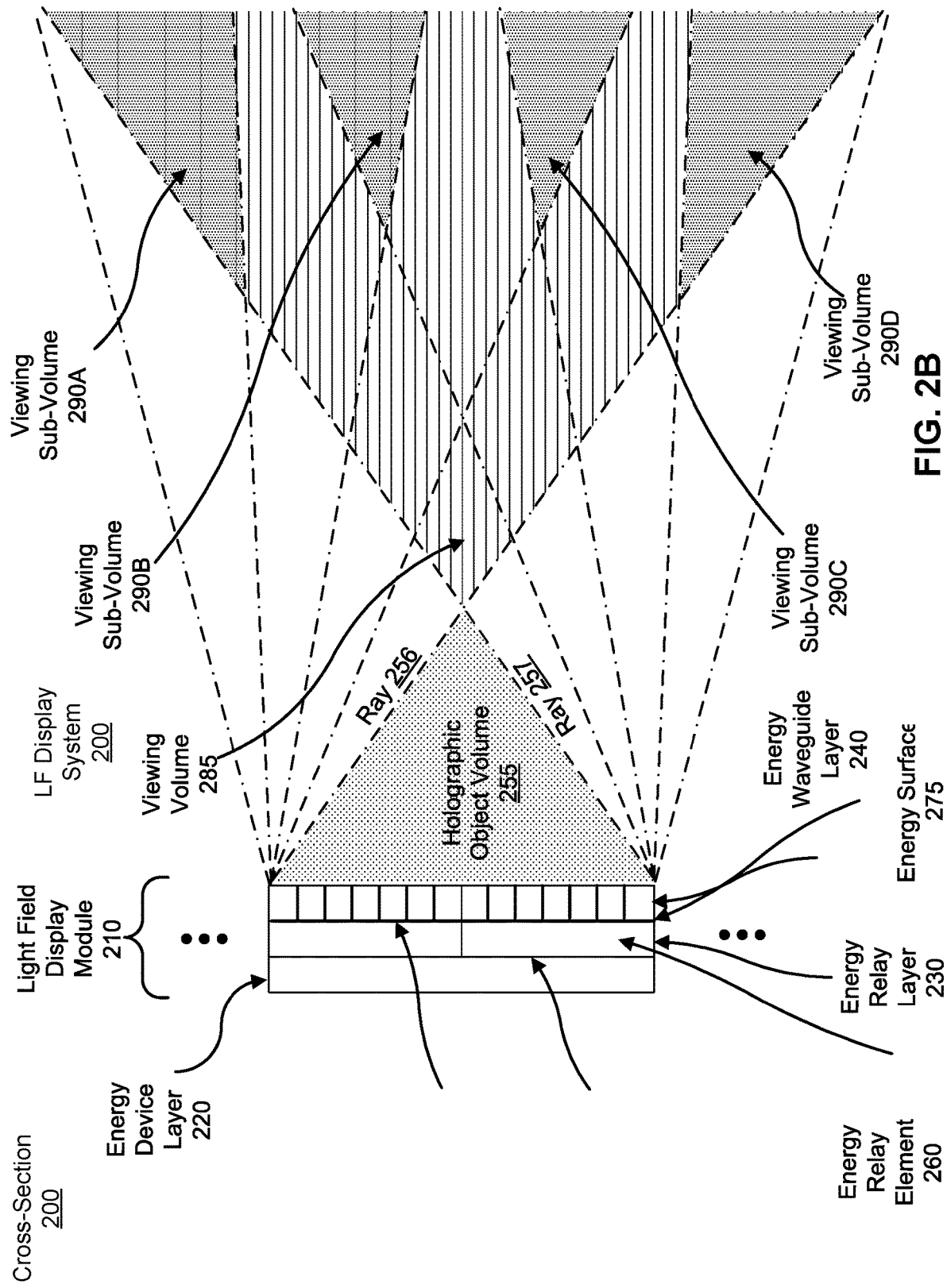
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes such that viewers in other example viewing volumes may perceive the holographic content. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 includes two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
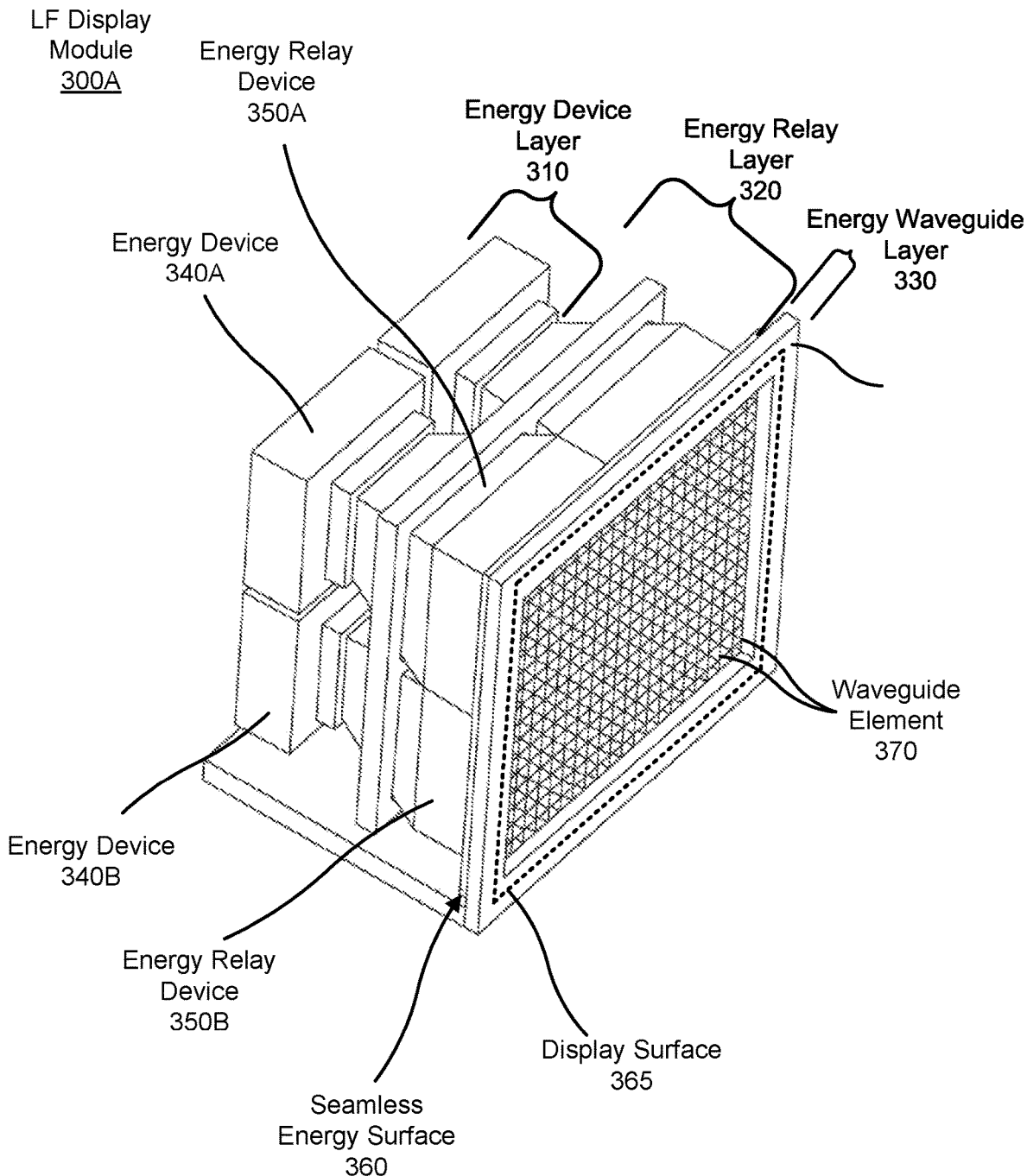
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay elements 350 (three are visible in the figure). The energy relay devices 350 may all relay the same type of energy (e.g., light), or may relay one or more different types (e.g., light and sound). Each of the relay elements 350 includes a first surface and a second surface, the second surface of the energy relay elements 350 being arranged to form a singular seamless energy surface 360. In the illustrate embodiment, each of the energy relay elements 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of 300 together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D plenoptic function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules 300.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with conductive elements. The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between waveguide elements, and/or co-located with structures designed to inhibit light transmission between waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under particular waveguide elements 370 are all energy sources, all energy sensors, or a mix of energy sources and energy sensors.

Figure 3B:
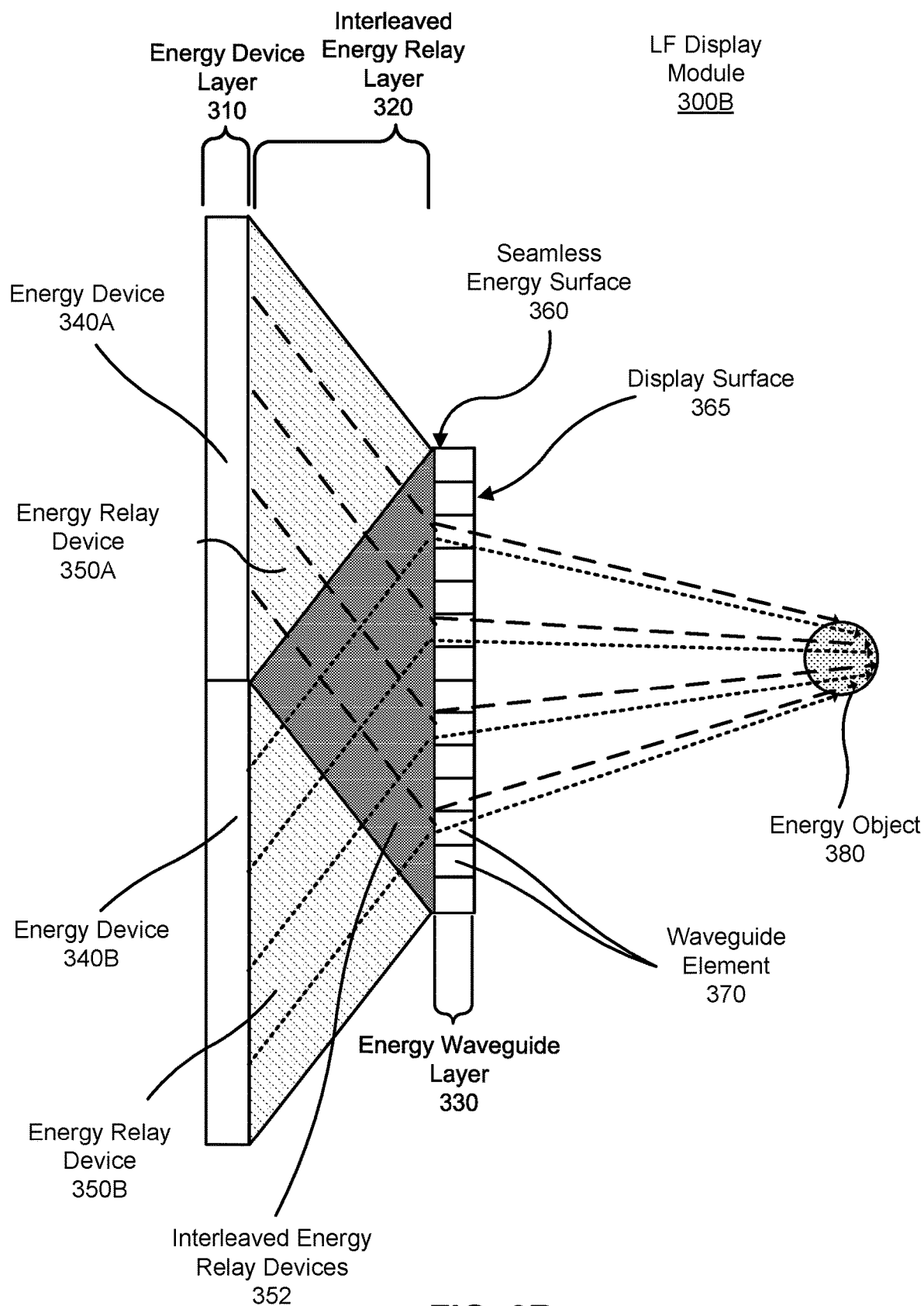
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. The LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 302 may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regards to FIG. 3A. Additionally, the LF display module 300B presents and/or receives energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 302 that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source and an imaging sensor is used as an energy sensor. In this manner, the LF display module 300B can simultaneously project holographic content and detect light from the volume in front of the display surface 365.

In an embodiment, the LF display module 300B is configured to simultaneously project a light field in front of the display surface 365 and capture a light field from the front of the display surface 365. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 302 may be configured such that the locations at the seamless energy surface 365 that are under a particular waveguide element 370 are all emissive display locations, all imaging sensor locations, or some combination of locations. In other embodiments, the bidirectional energy surface can project and receive various other forms of energy.

In another example embodiment of the LF display module 300B, the LF display module is configured to project two different types of energy. For example, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the bidirectional LF display module 302 may include multiple energy device layers with each energy device layer including a specific type of energy device. In these examples, the energy relay layers are configured to relay the appropriate type of energy between the seamless energy surface 360 and the energy device layer 330.

Tiled LF Display Modules

Figure 4A:
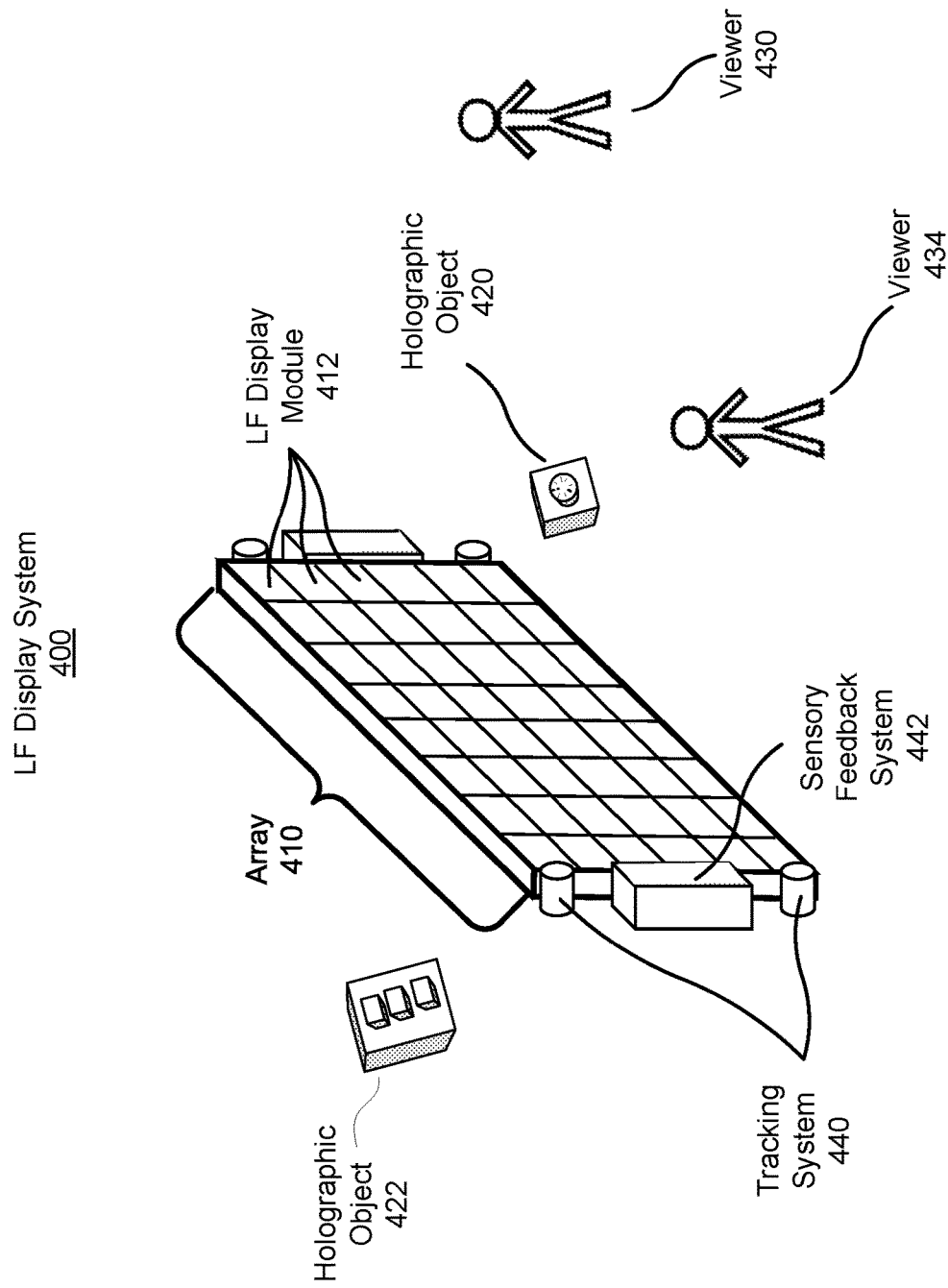
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The array 410 may cover, for example, some or all of a surface.

The array 410 may project one or more holographic objects. For example, in the illustrated embodiment the array 410 projects a holographic object 420 and a holographic object 430. Tiling of the LF display modules allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 430. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 440 and the viewer 450 of the holographic object 420 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434 as if it is further away from the viewers than the surface of the array 410.

In some embodiments, the LF display system 400 may include a tracking system that tracks positions of the viewer 430 and the viewer 435. In some embodiments, the tracked position is generally the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 440 and the eyes of the viewer 450 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in association with FIG. 5A. In other example embodiments, the tracking system may be incorporated into the array 410 as described herein. For example, an energy device (e.g., energy device 340) of a LF display module 412 included in the array 410 may be configured to capture images of viewers in front of the array 440. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include one or more infrared sources (e.g., structured light sources), one or more imaging sensors that can capture images in the infrared (e.g., red-blue-green-infrared camera), and a tracking module. The tracking system may use the depth estimation techniques to determine positions of viewers. In some embodiments, the LF display system 400 generates holographic objects based on tracked positions of the viewer 440 and/or the viewer 450. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. And the viewer 434 may be presented with the holographic object 422, but not the holographic object 420. The LF display system 400 tracks a position of each of the viewer 440 and the viewer 450. The LF display system 400 determines a perspective of a holographic object that should be visible to a viewer based on their relative position to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume. For example, as illustrated, the viewing volume is represented by all the space in front of and behind the array. In this example, because the LF display system 400 can track the position of the viewer 430 and viewer 434, the LF display system 400 may present two different holographic interfaces to the two viewers to operate the appliance. Thus, the LF display system 400 may project a "turnable dial" (e.g., holographic object 420) to a viewing sub-volume surrounding the viewer 430 and "a set of pressable buttons" content (e.g., holographic object 422) to a viewing sub-volume surrounding the viewer 434. In contrast, conventional systems would have to use individual headsets to provide such customized experiences.

In some embodiments, the LF display system 400 may include one or more sensory feedback systems. The sensory feedback systems provide other sensory stimuli (e.g., tactile, acoustic, temperature, and/or olfactory) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in association with FIG. 5A. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system that includes one or more acoustic projection devices external to the array. Alternatively or additionally, the LF display system 400 may include one or more acoustic projection devices integrated into the array 410 as described herein. The acoustic projection devices may project an ultrasonic pressure wave that generates volumetric tactile sensation (e.g., at a surface of the holographic object 420) for one or more surfaces of a holographic object if a portion of a viewer gets within a threshold distance of the one or more surfaces. The volumetric tactile sensation allows the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a presented holographic object by causing a volumetric tactile surface to be located either within a threshold distance of the surface of the holographic object, or coincident with the surface of the presented holographic object. In some embodiments, the resistance of the generated volumetric tactile surface to touch by the user may be based on a value of a parameter determined in the LF display system 400. In some embodiments, the volumetric tactile surface may be generated, modified, updated, or deleted based, at least partly, on information obtained from a tracking system 440 of the LF display system 400. In some embodiments, the LF display system used the information obtained from the tracking system 440 in conjunction with an artificial intelligence model to generate the volumetric tactile surface.

In various embodiments, the LF display system 400 may provide other sensory stimuli based in part on a tracked position of a viewer. For example, the holographic object 422 illustrated in FIG. 4A is a turnable dial, and the LF display system 400 may have the holographic object 422 rotate both visually (i.e., the holographic object 422 appears to rotate) and audibly (i.e., one or more acoustic projection devices emit a sound that the viewer 440 perceives as a clicking rotation sound emanating from the holographic object 430).

Note that, in the illustrated configuration, the holographic viewing volume may be limited in a manner similar to the viewing volume 285 of configuration 200. This can limit the amount of perceived immersion that a viewer will experience with a single display unit. One way to address this is to use multiple LF display modules that are tiled along multiple sides of an appliance as described below with respect to FIG. 4B.

Figure 4B:
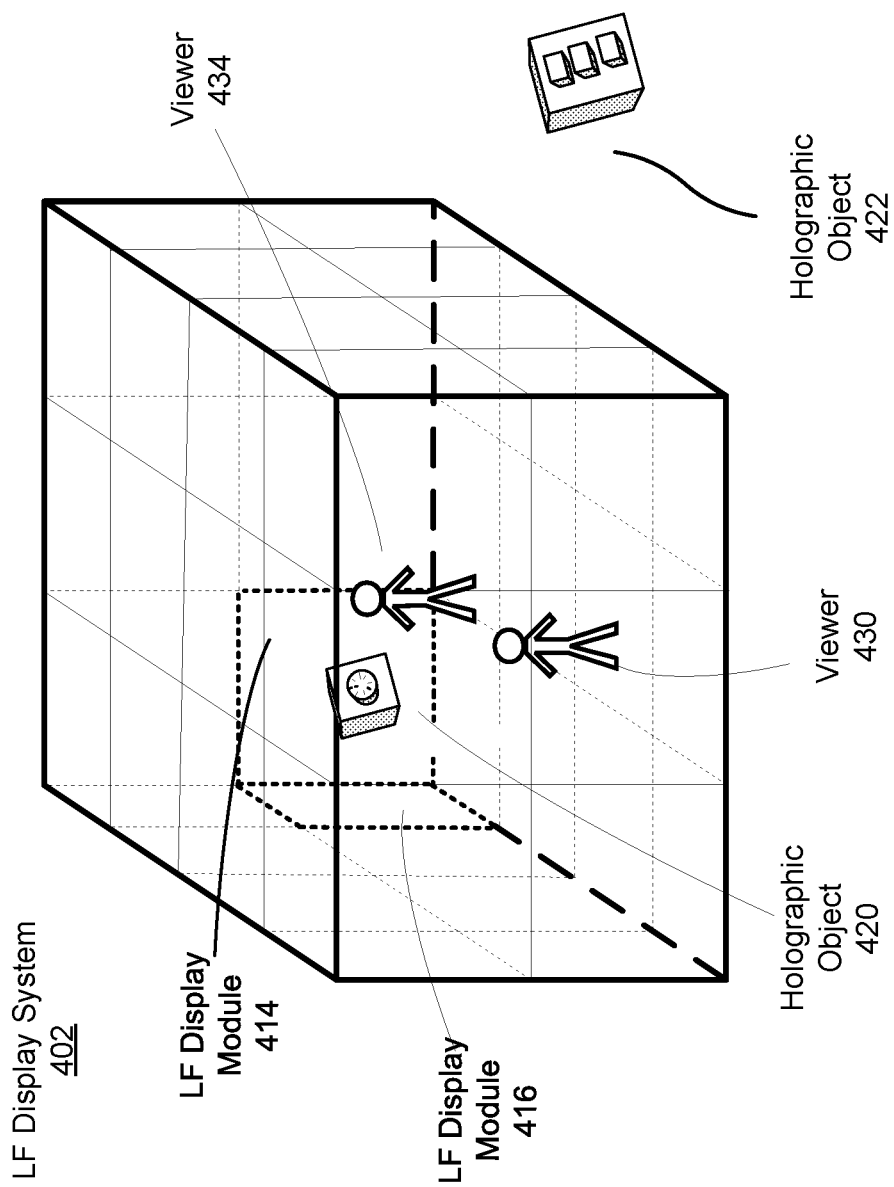
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In other embodiments, the plurality of LF display modules may cover some, but not all, of a surface, or some combination thereof. In other embodiments, a plurality of LF display modules are tiled to form some other aggregated seamless surface. For example, the surfaces may be curved such that a cylindrical aggregated energy environment is formed.

The LF display system 402 may project one or more holographic objects. For example, in the illustrated embodiment the LF display system 402 projects the holographic object 420 into an area enclosed by the six-sided aggregated seamless surface environment. Thus, the viewing volume of the LF display system is also contained within the six-sided aggregated seamless surface environment. Note that, in the illustrated configuration, the viewer 432 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420. In this manner, occlusion by viewers in the space can cause some portion of the holographic projections to disappear, but the effect is much less than if only one side of the volume was populated with holographic display panels. Holographic object 422 is illustrated "outside" the enclosure of the six-sided aggregated seamless surface environment because the holographic object volume extends behind the aggregated surface. Thus, the viewer 430 and/or the viewer 434 can perceive the holographic object 422 as "outside" of a six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface. In some other examples, an aggregate surface may only occur on a portion of a surface rather than a whole surface. Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
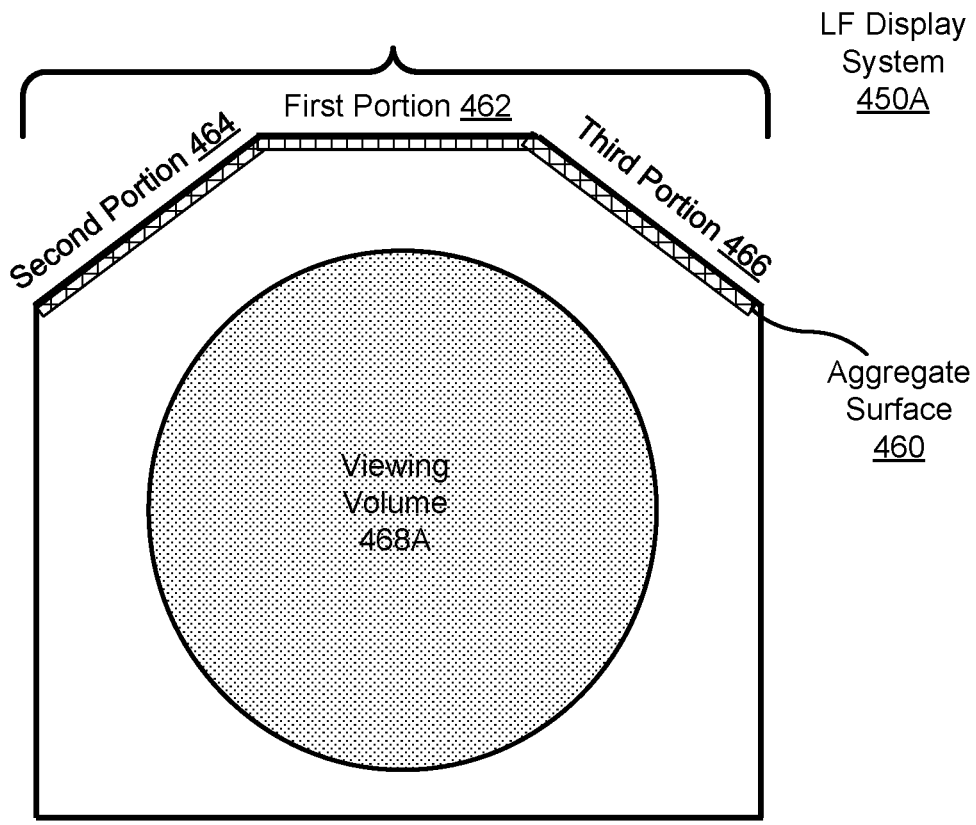
FIG. 4C is a top-down view of a light field display system with an aggregate surface in a winged configuration, in accordance with one or more embodiments.
Figure 4D:
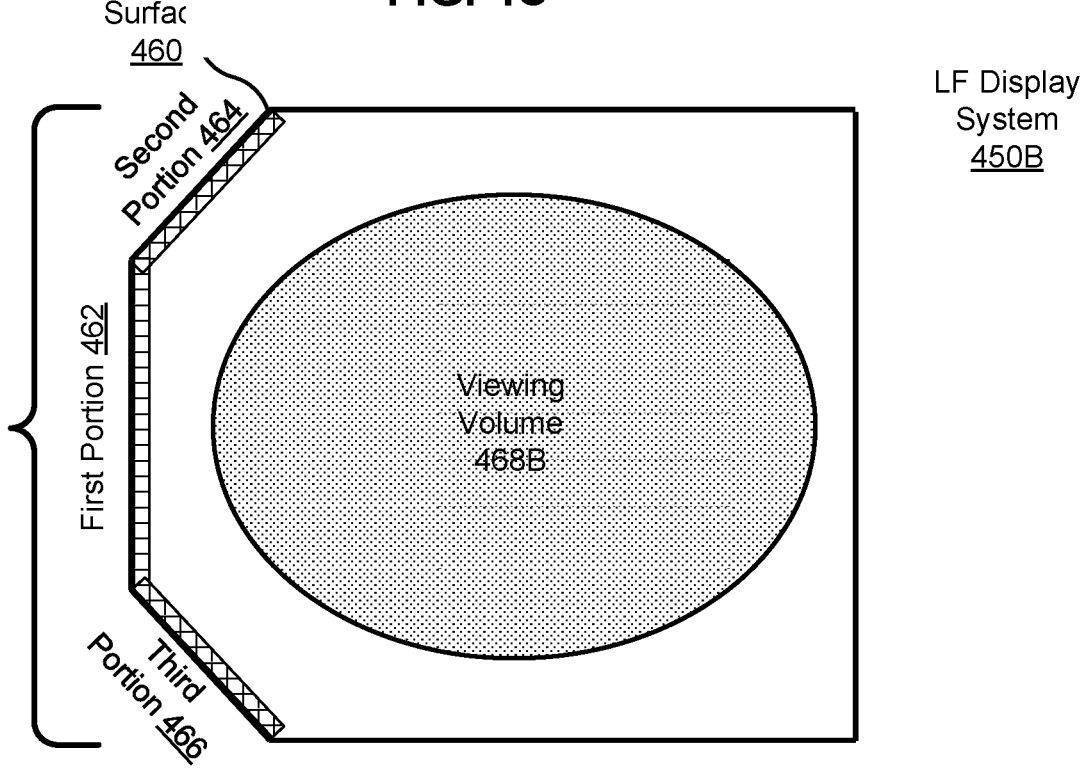
FIG. 4D is a side view of a light field display system with an aggregate surface in a sloped configuration, in accordance with one or more embodiments.

For example, FIG. 4C illustrates top down view of a LF display system 450A with an aggregate surface in a "winged" configuration. The LF display system 450A includes LF display modules tiled to form an aggregate surface 460. The LF Display system 450A has an aggregate surface 460 which includes three portions: (i) a first central portion 462, (ii) a second portion 464 connected to the first portion 462 and placed at an angle from the central portion to project energy towards the front of the central portion (i.e., a first side surface), and (iii) a third portion 466 connected the first portion 462 and placed at an angle from the central portion to project energy towards the front of the central portion (i.e., a second side surface). When the mobile device is held so that the first central portion is in a vertical plane with a horizontal and a vertical axis, the second and third portions are angled towards the front of the central portion along the horizontal axis.

In this example, the viewing volume 468A of the LF display system 450A lies in front of the device partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Additionally, as described below in regards to FIG. 6, deflection optics may be used to optimize the size and position of the viewing volume for LF display parameters (e.g., dimensions and FOV).

Returning to FIG. 4D, in a similar example, FIG. 4D illustrates a side view of a LF display system 450B with an aggregate surface in a "sloped" configuration. The LF display system 450B includes LF display modules tiled to form an aggregate surface 460. The aggregate surface 460 includes three portions: (i) a first portion 462 (i.e., a central surface), (ii) a second portion 464 connected to the first portion 462, and placed at an angle from the central portion to project energy towards the front of the central portion (i.e., a first side surface), and (iii) a third portion 464 connected to the first portion 462, and placed at an angle from the central portion to project energy towards the front of the central portion (i.e., a second side surface). When the mobile device is held so that the first portion is a vertical plane with a horizontal and a vertical axis, the second and third portions are angled towards the front of the central portion along the vertical axis.

In this example, the viewing volume 468B of the LF display system 450B is in front of the central portion and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front display were used. Additionally, the configuration of the LF display system and the environment which it is located may inform the shape and locations of the viewing volumes and viewing sub-volumes.

Figure 4E:
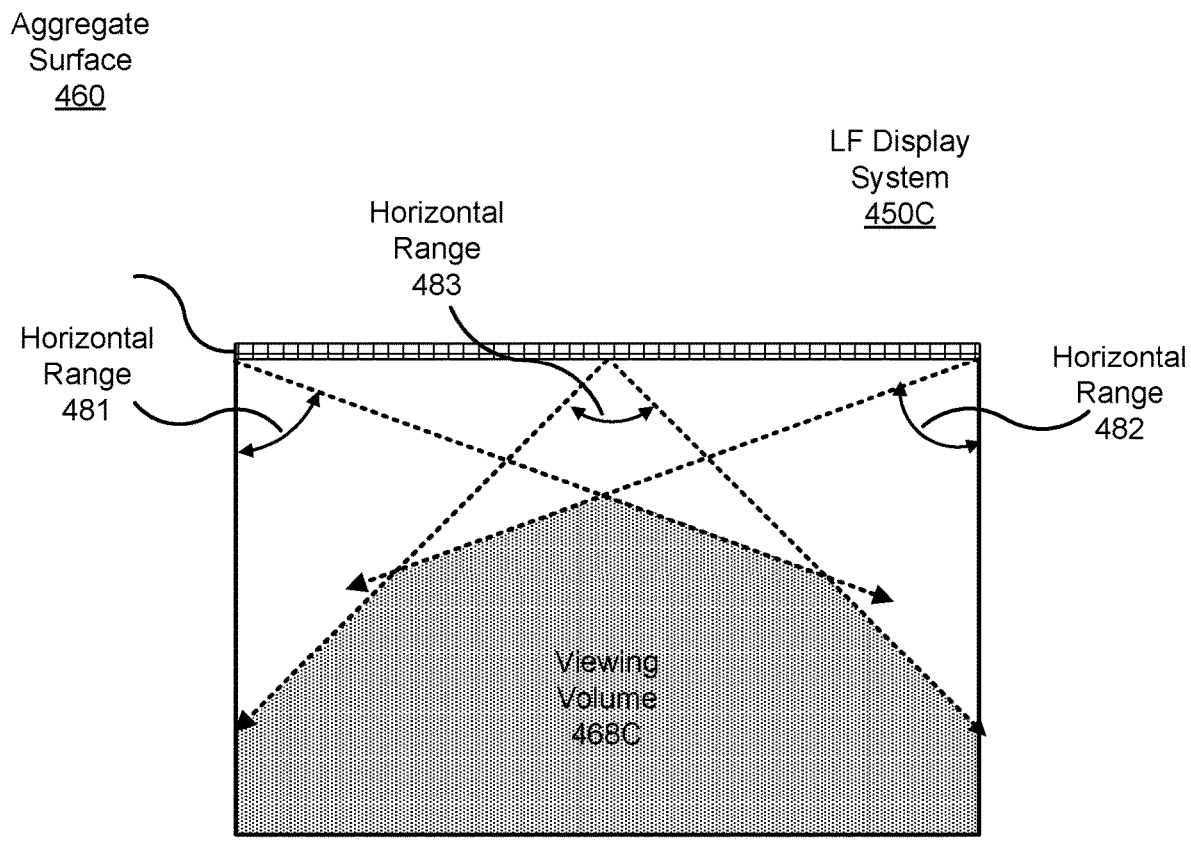
FIG. 4E is a top-down view of a light field display system with an aggregate surface on a front panel of a device, in accordance with one or more embodiments.

FIG. 4E, for example, illustrates a top down view of a LF display system 450C with an aggregate surface 460. The LF display system 450C projects various rays from the aggregate surface 460. The rays projected from the left side of the aggregate surface 460 have horizontal angular range 481, rays projected from the right side of the aggregate surface have horizontal angular range 482, and rays projected from the center of the aggregate surface 460 have horizontal angular range 483. In between these points, the projected rays may take on intermediate values of angle ranges. Having a gradient deflection angle in the projected rays across the display surface in this manner creates a viewing volume 468C.

Control of a LF Display System

Figure 5:
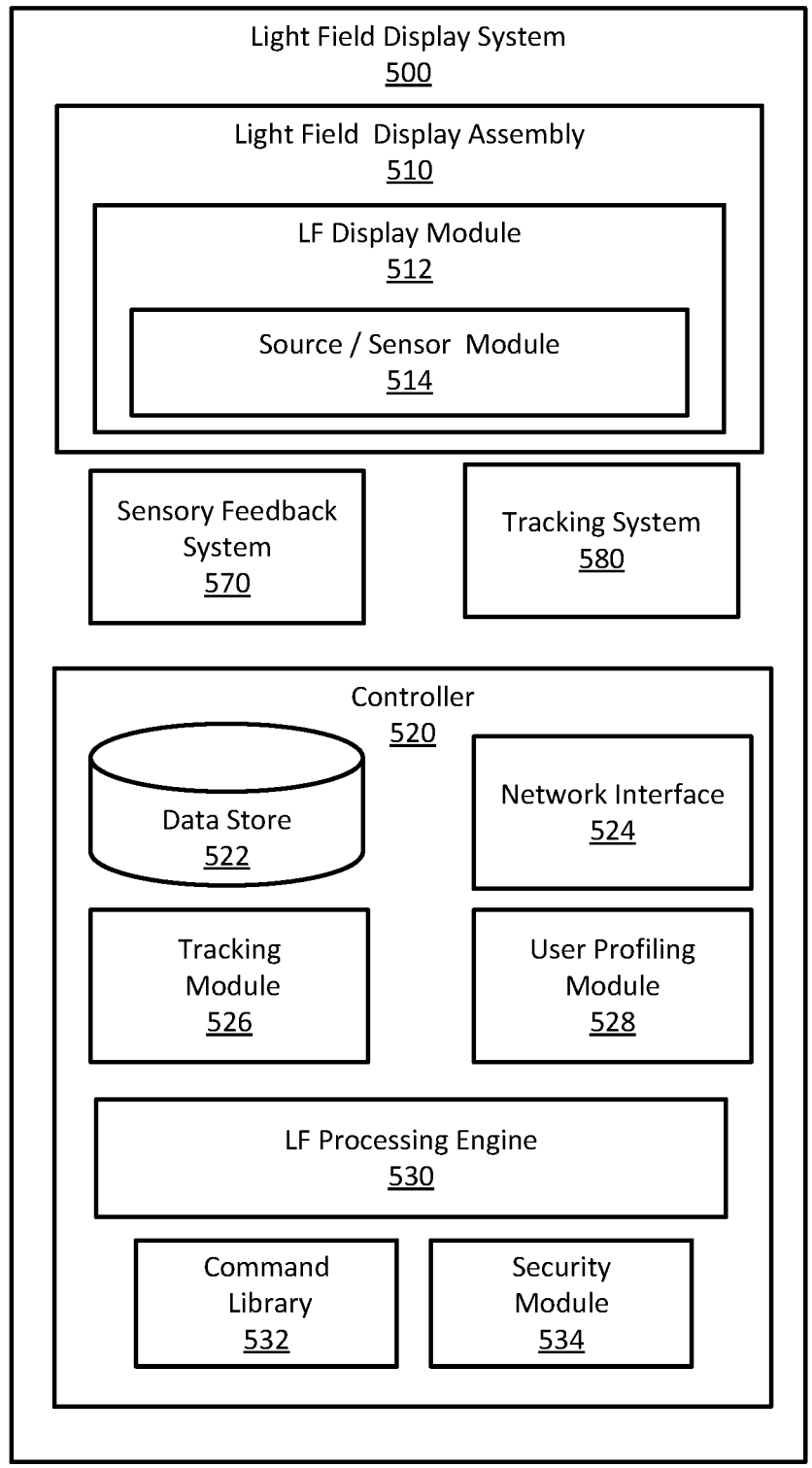
FIG. 5 is a block diagram of a light field display system, in accordance with one or more embodiments.

FIG. 5 is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a data store 522, a network interface 524, a LF processing engine 530, a command library 532, and a security module 534. The controller 520 may also include a tracking module 526, and a user profiling module 528. In some embodiments, the LF display system 500 also includes a sensory feedback system 570 and a tracking system 580. The LF display systems described in the context of FIGS. 1, 2, 3, and 4 are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-8.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface of the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a curved surface, etc.). That is, the tiled LF display modules form an aggregate surface. As previously described, a LF display module 512 may include an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, or olfactory) using a sensory feedback assembly 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, transducers, etc. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not.

To illustrate, in an example embodiment of a light field display system 500, a sensory feedback system 570 may include acoustic projection devices. The acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the target area when executing display instructions received from the controller. Further, the sensory feedback system 570 may include a temperature adjustment device. The temperature adjustment device is configured to increase or decrease temperature in some, or all, of the target area when executing display instructions received from the controller 520. In some embodiments, the sensory feedback system 570 may include a force actuating device. The force actuating device may be used to move some physical objects in the target area.

In some embodiments, the sensory feedback assembly 570 is configured to receive input from users of the LF display system 500. In this case, the sensory feedback system 570 includes various sensory feedback devices for receiving input from users. The sensor feedback devices may include devices such as acoustic receiving devices (e.g. a microphone), pressure sensors, motion detectors, etc. The sensory feedback assembly 570 may include sensory feedback devices that are configured to provide sensory feedback as holographic content is presented. The sensory feedback system may transmit the detected input to the controller 520 to coordinate generating holographic content and/or sensory feedback.

To illustrate, in an example embodiment of a light field display assembly, a sensory feedback system 570 includes a microphone. The microphone is configured to record audio produced by one or more appliance users. The sensory feedback system 570 provides the recorded audio to the controller 520 as user input. The controller 520 may use the user input to generate holographic content. Similarly, the sensory feedback system 570 may include a pressure sensor. The pressure sensor is configured to measure forces applied by users to the pressure sensor. The sensory feedback system 570 may provide the measured forces to the controller 520 as user input.

In some embodiments, the sensory feedback assembly 570 is configured also to redirect user movement. In one embodiment, the sensory feedback assembly 570 includes an acoustic projection device which can create a tactile pressure wave to discourage movement, such as, for example, opening an oven door before a timer goes off. In another embodiment, the sensory feedback assembly 570 may use an acoustic emitting device to audibly signal the user from further action (e.g., "Do not open the oven door").

In some embodiments, the LF display system 500 includes a tracking system 580. The tracking system 580 includes any number of tracking devices configured to obtain information about a user of the device, the information including position, movement, gesture, expression, gaze, and/or other characteristics of people in the target area such as age and gender. Generally, the tracking devices are external to the LF display assembly 510. Some example tracking devices include a camera assembly ("camera"), a depth sensor, structured light, a LIDAR system, a card scanning system, or any other tracking device that can track viewers within a target area.

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameters when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display module included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520. In some embodiments, the camera assembly may illuminate a particular portion of the appliance to generate visual information for display to the viewer. For example, internal sensors such as cameras may reside within a refrigerator to image contents of the refrigerator and provide the information to the controller 520 for information regarding generating a holographic display of the contents of the refrigerator.

The camera of the tracking system 580 may adjust one or more imaging parameters when executing tracking instructions received from the controller 520. An imaging parameter is a parameter that affects how the camera assembly captures images. An imaging parameter may include, e.g., frame rate, aperture, gain, exposure length, frame timing, some other parameter that affects how the camera assembly captures images, or some combination thereof.

In some embodiments, the tracking system 580 is configured also to receive input from viewers of the LF display system 500. The tracking system 580 may track a viewer's body movement and send information regarding a particular tracked movement to the controller 520. In some embodiments, the tracking system 580 is used in concert with a holographic user interface presented to the user.

The controller 520 controls the LF display assembly 510 and any other components of the LF display system 500. The controller 520 comprises a data store 522, a network interface 524, a tracking module 526, a user profiling module 528, a light field processing engine 530, and a command library 532. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, virtual models of target areas, tracking information, images captured by the camera, one or more user profiles, calibration data for the light field display assembly 510, configuration data for the LF display system 510 including resolution and orientation of LF modules 512, desired viewing volume geometry, content for graphics creation including 3D models, scenes and environments, materials and textures, security related information including authentication factors such as passwords, smart cards, biometric data that may be used by the security module 534, other information that may be used by the LF display system 500, or some combination thereof. The data store 522 is a memory, such as a read only memory (ROM), dynamic random-access memory (DRAM), static random-access memory (SRAM), or some combination thereof.

The network interface 524 allows the light field display system to communicate with other systems or environments via a network. In one example, the LF display system 500 receives holographic content from a remote server such as a third-party provider via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526 via the controller 520.

The tracking module 526 may determine a position of one or more viewers within a target area of the mobile device. The determined position may be relative to some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track viewers. In other embodiments, the tracking module 526 actively tracks viewers. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500, such as for example while using a holographic user-interface (further described below) to operate the appliance. The tracking information may include body movements that correspond to various input options that the viewer is provided by the LF display system 500. For example, the tracking module 526 may track a viewer's body movement and assign any various movement as an input to the LF processing engine 530. The tracking module 526 may provide the tracking information to the data store 522, the LF processing engine 530, the user profiling module 528, the command store 532, any other component of the LF display system 500, or some combination thereof.

To provide context for the tracking module 526, consider an example embodiment of an LF display system 500 used in a microwave. When the user responds to an exploding boiled egg in the microwave by running and yelling towards the appliance, the tracking system 580 may record the movement of the user and transmit the recording to the tracking module 526. The tracking module 526 tracks the motion of the user hands in the recording and sends the input to LF processing engine 530, described below. The user profiling module 528, as described below, determines that information in the image indicates that motion of the user is associated with a negative response. Accordingly, the LF processing engine 530 generates appropriate holographic content to commiserate with the user. For example, the LF processing engine 530 may project a sad-faced holographic avatar stating "Better luck next time!" in the holographic object volume.

The LF display system 500 includes a user profiling module 528 configured to identify and profile users. The user profiling module 528 generates a profile of a user (or users) that views holographic content displayed by a LF display system 500. The user profiling module 528 generates a user profile based, in part, on user input and monitored user behavior, actions, and reactions. The user profiling module 528 can access information obtained from tracking system 580 (e.g., recorded images, videos, sound, etc.) and process that information to determine various information. In various examples, user profiling module 528 can use machine vision and/or machine learning algorithms to determine user behavior, actions, and reactions. Monitored user behavior can include, for example, smiles, cheering, clapping, laughing, fright, screams, excitement levels, recoiling, other changes in gestures, or movement by the users, etc.

More generally, a user profile may include any information received and/or determined about a user viewing holographic content from the LF display system. For example, each user profile may log actions or responses of that user to the content displayed by the LF display system 500. Some example information that can be included in a user profile are provided below.

A user profile may be based on behavior of a user with respect to content displayed by the LF display system 500. In some embodiments, software applications residing in the device may be functionally integrated with the LF display system 500, and the user profile is based on user behavior that are monitored while executing these software applications in the device.

Thus, for example, monitored behavior may include features such as a number of times a user uses an appliance in a period of time such as a day or a week, how often a user uses a particular setting on an appliance (e.g., how often is a washer appliance used on a heavy bedding washer setting), how the user responds to certain types of holographic content (e.g., in an oven—what elicits the quickest response from the user—a holographic image of a roasting turkey with a sign stating that the roast time set has been exceeded by 20 minutes or a flashing holographic image of a burnt turkey), some other behavior relating to the use of the particular appliance, or some combination thereof. In some embodiments, an appliance may also have tiers of users (e.g., such as daily user, weekly user, occasional user in a laundry machine at a laundromat). In these embodiments, the tracking system may positively identify the user. Once the tracking system accesses the user profiling module, the LF display system 500 may determine that user's status (e.g., as daily user, weekly user, occasional user) and could provide holographic content specific to that user's status. The user profiling module may additionally receive further information for a user from other modules or components of the controller 520 which can then be stored with the user profile. Other components of the controller 520 may then also access the stored user profiles for determining subsequent content to be provided to that user.

In another example, the user may exhibit preferences for haptic interfaces that are presented in conjunction with holographic content, for example preferred key click sensitivities in a holographic keyboard touch interface that may be generated by the LF display system 100 and offered as an option to the appliance user.

Other user characteristics stored as part of user profile information may include, e.g., name of a user, age of a user, ethnicity, viewing location, device and application setting preferences, place of residence, any other demographic information, or some combination thereof.

The user profiling module 528 may also access a profile associated with a particular user (or users) from a third-party system or systems to build and/or update a user profile. The viewer profiling module 528 may be configured to update the user profile using information from a social media account of the user (or users). For example, user interactions with third-party vendors that are linked to that user's social media or other online accounts may provide further user profile information that may be accessed by the user profiling module 528. Thus, the user profile information could store information such as a favored laundry detergent product in an LF display system associated with a washing machine, or a favored music genre for playing on a home audio system.

In some embodiments, the data store 522 includes a user profile store that stores user profiles generated, updated, and/or maintained by the user profiling module 528. The user profile can be updated in the data store at any time by the user profiling module 528. For example, in an embodiment, the user profile store receives and stores information regarding a particular user in their user profile when the particular user views holographic content provided by the LF display system 500. In this example, the user profiling module 528 includes a facial recognition algorithm that may recognize users and positively identify as they view presented holographic content. To illustrate, as a user enters the target area of the LF display system 500, the tracking system 580 obtains an image of the user. The user profiling module 528 inputs the captured image and identifies the user's face using the facial recognition algorithm. The identified face is associated with a user profile in the profile store and, as such, all input information obtained about that user may be stored in their profile. The user profiling module may also utilize card identification scanners, voice identifiers, a radio-frequency identification (RFID) chip scanners, barcode scanners, etc. to positively identify a user.

Because the user profiling module 528 can positively identify users, the user profiling module 528 can determine each visit of each user to the LF display system 500. The user profiling module 528 may then store the time and date of each visit in the user profile for each user. Similarly, the user profiling module 528 may store received inputs from a user from any combination of the sensory feedback system 570, the tracking system 580, and/or the LF display assembly 510 each time they occur. The user profile system 528 may additionally receive further information about a user from other modules or components of the controller 520 which can then be stored with the user profile. Other components of the controller 520 may then also access the stored user profiles for determining subsequent content to be provided to that user. The controller 520 may be configured to generate holographic content based at least in part accessed data from the stored user profiles.

The LF processing engine 530 generates 4D coordinates in a rasterized format ("rasterized data") that, when executed by the LF display assembly 510, cause the LF display assembly 510 to present holographic content. The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4D coordinates and sensory data represent display instructions executable by a LF display system to generate holographic and sensory content.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short video for holographic projection by a LF display system 500 (for example, a tutorial demonstrating use of an appliance to a new user). In this example, the LF display system 500 includes a display containing several gigapixels and the rasterized data contains information for each pixel location on the display. The corresponding size of the rasterized data is vast (e.g., many gigabytes per second of video display time), and unmanageable for efficient transfer over commercial networks via a network interface 524. An additional problem with merely storing rasterized data on data store 522 arises when an interactive experience is desired using inputs from the sensory feedback system 570 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In summary, the LF processing engine 530 may generate holographic content derived from rasterized data accessed from the data store 522, vectorized data accessed from the data store 522, or vectorized data received via the network interface 524. In some configurations, the LF processing engine 530 may generate the holographic content using a combination of rasterized data accessed from the data store, vectorized data accessed from the data store 522, and vectorized data received via the network interface. In various configurations, vectorized data may be encoded before data transmission and decoded after reception by the LF controller 520. In some examples, the vectorized data is encoded for added data security and performance improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors.

Vectorized data contains all the information for each of the sensory domains supported by a LF display system 500 in way that supports an interactive experience. For example, vectorized data for an interactive holographic experience includes any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data from a LF display assembly 510. In various configurations, the vectorized properties may include one or more red/green/blue/alpha channel (RGBA)+ depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 can also generate an interactive viewing experience. That is, holographic content may be responsive to input stimuli containing information about user locations, gestures, interactions, interactions with holographic content, or other information derived from the user profiling module 528, and/or tracking module 526. For example, if a displayed holographic object needs to move in a certain direction immediately in response to a user interaction, the LF processing engine 530 may update the render of the scene so the holographic object moves in that required direction. This may require the LF processing engine 530 to use a vectorized data set to render light fields in real time based on a 3D graphical scene with the proper object placement and movement, collision detection, occlusion, color, shading, lighting, etc., correctly responding to the user interaction. The LF processing engine 530 converts the vectorized data into rasterized data for presentation by the LF display assembly 510.

The rasterized data includes holographic content instructions and sensory instructions (display instructions) representing the real-time performance. The LF display assembly 510 simultaneously projects holographic and sensory content of the real-time performance by executing the display instructions. The LF display system 500 monitors user interactions (e.g., vocal response, touching, etc.) with the presented real-time performance with the tracking module 526 and user profiling module 528. In response to the user interactions, the LF processing engine creates an interactive experience by generating additional holographic and/or sensory content for display to the users.

To illustrate, consider an example embodiment of an LF display system 500 including a LF processing engine 530 that generates, during the execution of an application in the device, a holographic object representing a loaf of baking bread in the viewing volume of the user. A user may move to touch the holographic object representing the loaf. Correspondingly, the tracking system 580 tracks movement of the user's hands relative to the holographic object. The movement of the user is recorded by the tracking system 580 and sent to the controller 520. The tracking module 526 continuously determines the motion of the user's hand and sends the determined motions to the LF processing engine 530. The LF processing engine 530 determines the placement of the user's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the user is given both a visual and tactile perception of touching the bread loaf. More simply, when a user views his hand touching a holographic bread loaf, the user simultaneously feels haptic feedback indicating their hand touches the holographic bread loaf, and the loaf changes position or motion in response to the touch.

LF processing engine 530 may provide holographic content for concurrent display to users of a media content using the appliance. For example, a cooking video being viewed on an oven that is augmented with a LF display system 500 may include holographic content to be presented to the user during the video ("holographic content track"). The holographic content track may be received by the appliance and stored in the data store 522. The holographic content track includes holographic content that enhances the viewing experience of a user viewing the video on the appliance.

The holographic content in a holographic content track may be associated with any number of temporal, auditory, visual, etc. cues to display the holographic content. For example, the holographic content track can include holographic content to be displayed at a specific time during a video. As an illustration, the holographic content track may include a cooked apple pie to display during the video "How to bake an apple pie from scratch" 12 minutes and 42 seconds after the video begins. In another example, a holographic content track includes holographic content to be presented when sensory feedback system 570 records a specific audio cue. As an illustration, a holographic content track includes a holographic avatar demonstrating dough kneading instructions to present during a bread baking video when audio recorded by sensory feedback assembly 570 indicates that the user/player asked for more help. In another example, a holographic content track includes holographic content to display when the tracking system 580 records a specific visual cue. As an illustration, a holographic content track includes a holographic flashing sign with the words "Do you want to stop?" on display when a tracking system 580 records information indicates that a user is moving away from the appliance while a video tutorial is being displayed. Determining auditory and visual cues is described in more detail below.

The holographic content track may also include spatial rendering information. That is, the holographic content track may indicate the spatial location for presenting holographic content in displayed video track. For example, the holographic content tract may indicate that certain holographic content is to be presented in some holographic viewing volumes while not others. To illustrate, LF processing engine 530 may present a holographic screen displaying contents of a refrigerator shelf in a holographic viewing volume directly in front of the user's face. Similarly, the holographic content track may indicate holographic content to present to some viewing volumes while not others. For example, the LF processing engine may present the holographic screen to a viewing volume directly in front of the user's face but not in any other viewing volume so that the displayed contents is private to the user only.

LF processing engine 530 may provide holographic content to display to the user in conjunction with a specific application executing on the appliance. The holographic content may be received at the appliance over a network, provided as part of advertising content in association with specific applications executing on the device (for example, a laundry detergent specifically for silks and woolens when a delicate wash cycle is started on a washing machine), generated by a LF processing engine 530, etc. The holographic content may be stored in the data store 522, or streamed to the LF display system 500 in vectorized format through the network interface 524. For example, when a user of a washing machine starts a laundry wash cycle specifically on the "delicate" cycle, the LF display system 500 may access holographic content of an advertisement for a laundry detergent designed specifically for silks and woolens, and display this during the course of the washing cycle.

The LF processing engine 500 may also modify holographic content to suit environmental characteristics at a location. For example, based on whether the consumer device is located in a dark room space, in a brightly lit room, a sunny location, etc., the LF processing engine may modify the holographic content to be displayed with brightness that is appropriate to the lighting of the location. The LF processing engine may use data stored in the data store 522 along with information from a camera system in the tracking module 580 to customize the display of the holographic content. Furthermore, the modification of the holographic content may also take user display preferences as determined by the user profiling module 528.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 may obtain or receive information from the data store 522, the tracking module 526, the user profiling module 528, the sensory feedback system 570, the tracking system 580, or some combination thereof, to create holographic content for display. In some examples, LF processing engine 530 may access information from elements of the LF display system 500 (e.g., tracking information and/or a user profile), create content based on that information, and display the created content using the LF display system 500 in response. The created content may be holographic content. The created holographic content may be augmented with other sensory content (e.g., touch, audio, or smell) when displayed by the LF display system 500. Further, the LF display system 500 may store created holographic content in the data store 522 for future use.

In some embodiments, the LF processing engine 530 may cause the generated holographic display to be updated, modified, deleted, paused, or a combination thereof in response to changing an operating state of the consumer device. In some embodiments, the LF processing engine 530 may cause the generated holographic display to be updated, modified, deleted, paused, or some combination thereof in response to information that is received from by the tracking system 580 and interpreted by the tracking module 526. For example, the tracking module 580 may provide captured gaze information from the tracking system 580 to the LF display module for re-rendering the holographic content to make eye-contact with the user who is interacting with the device.

In some embodiments, the LF display system 500 includes a command library 532. The command library 532 may act as a command interface that recognizes and interprets user commands. The user commands may be interpreted based on tracking information received from the sensory feedback system 570 (e.g., audio), the tracking module 526 (e.g., tracked gestures or expressions), the user profiling module 528 (e.g., stored individual preferences), or some combination thereof. The command library 532 may apply heuristics to interpret the user commands, and direct the LF processing engine 530 to generate the appropriate display, tactile, and any other multisensory information. The command library 532 stores mappings of received user commands to computational commands that can be executed by the LF display system 500. The command library 532 also stores heuristics associated with the stored mappings. The command library 532 may receive user commands through a holographic user interface that is displayed by the LF display system 500. Examples of possible user commands received through the displayed holographic user interface may include varied particular touch contact of a holographic object by the user (for example, a finger touch of a particular displayed holographic "button") and varied touch movement against the surface of a holographic object (for example, turning a displayed holographic "knob"). In some embodiments, a touch contact or a touch movement may be determined to have occurred when the user is determined by the tracking module 526 to be within a threshold distance of a displayed holographic object in the displayed holographic user interface. In some embodiments, user commands may include sensory feedback provided by the user such as verbal commands spoken by the user while within the target area (for example, a spoken command of the form "show me Grandma's apple pie video" that is captured using an acoustic receiver), gestures and body movements captured by the tracking system 580 (for example, a hand held up by a user in a target area to indicate that the timer should pause), sensing a physical switch, knob, button, or dial connected to the display as part of the sensory feedback system 570, etc., or a combination thereof.

The computational commands to be executed by the LF processing engine corresponding to the received user commands may include commands to display particular holographic objects, update the display of holographic content, modify the display of a particular holographic object, display a sequence of holographic objects, pause or play content being presented by the LF display system 500, delete a displayed object, or a combination thereof. Other computational commands may involve actuating other sensors and controls, such as, for example consumer device controls such as a baking temperature setting button, and changing the operating state of the consumer device. Thus, in some embodiments, a detected user action, for example, turning a displayed holographic "dial," is reported by the tracking system 580 to the command library 532. In response, the command library 532 may apply a heuristic from the stored heuristics and determine that a computational command needs to be executed involving sending instructions to the system to, for example, set the timer application in appliance appropriately.

In some embodiments, the command library 532 receives information from the data store 522 and the tracking module 580 to resolve ambiguous mappings based on user commands that may be detected with less confidence. However, information from the tracking system 580 and the user profile information from the data store 522, may provide sufficient heuristic information to disambiguate the mappings and determine the specific computational command to be executed. This determined computational command is then provided to the LF processing engine 530 for execution.

In some embodiments, the LF display system 500 includes a security module 534. The security module 534 enforces secure access to at least some of the functionalities provided by the LF display system. To do so, the security module 534 may generate user interface elements by the LF display system 500 for receiving authentication credential information such as passwords or biometric data from a user of the consumer device. The security module authenticates the credential information based on data stored in the data store 522. Subsequent to authenticating the user, the security module 534 may enable secure access by the user to some or all of the functionalities of the LF display system 500. In some embodiments, the security module 534 may activate internal sensors within the consumer device, such as internal cameras that are located to record images of elements such as internal mechanical elements and internal circuitry. In some embodiments, the security module 534 may provide the images from the internal cameras directly to the authenticated user for viewing. In some embodiments, the security module 534 may receive information from the internal sensors and provide the information to the LF processing engine 530 for generating holographic content based on the received information. In some embodiments, the LF processing engine 530 may process the information from the internal sensors, and use the processed data for mapping to stored data in the data store 522, and generate/retrieve the holographic content and display them to the user. In some embodiments, the LF processing engine 530 may employ an AI model to map the information from the internal sensors to information stored in the data store 522 and subsequently generate/retrieve the holographic content. For example, a licensed oven repair technician may provide authentication credentials to obtain secure access to the internal circuitry associated with a broiler element of the oven. Upon authentication, the security module 534 may activate internal cameras to receive images related to the internal circuitry, and provide the images to the LF processing engine 530. The LF processing engine 530 may process the received image data and map the processed image data to data stored in the data store 522 that is associated with depiction of a broken heating element. The LF processing engine may subsequently generate or retrieve holographic content depicting a broken heating element based on the mapped data, and display it to the licensed oven repair technician. The security module 534 may provide information related to authenticating a user of the consumer device to the data store 522, the user profiling module 528, the LF processing engine 530, the command library 532, any other component of the LF display system 500, or some combination thereof.

Dynamic Content Generation for a LF Display System

In some embodiments, the LF processing engine 530 incorporates an artificial intelligence (AI) model to create holographic content for display by the LF display system 500. The AI model may include supervised or unsupervised learning algorithms including but not limited to regression models, neural networks, classifiers, or any other AI algorithm. The AI model may be used to determine user preferences based on user information recorded by the LF display system 500 (e.g., by tracking system 580) which may include information on a user's behavior. The AI model may also store the learned preferences of each user in the user profile store of the data store 522. In some examples, when multiple users may operate the appliance, the AI model may create holographic content for the particular individual user based on the learned preferences of that user. The AI model may access information from the data store 522 to create the holographic content. In some embodiments, the AI model may use results of the learning algorithms to establish user-specific heuristics for the command mappings stored in the command library 532.

One example of an AI model that can be used to identify characteristics of users, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. In some examples, the transformation can also be determined through a set of weights and parameters used to transform between previous layers in the model.

The input to the model may be an image taken by tracking system 580 encoded onto the first convolutional layer and the output of the model is holographic content decoded from the output layer of the neural network. Alternatively or additionally, the output may be a determined characteristic of a user in the image. In this example, the AI model may identify latent information in the image representing user characteristics in one of the intermediate layers of the neural network. Relevance information between elements identified in the layers can be retrieved by applying a set of transformations between the corresponding intermediate layers. The weights and parameters for the transformations may indicate relationships between information contained in the starting layer and the information obtained from the final output layer. For example, the weights and parameters can be a quantization of shapes, colors, sizes, etc. included in information representing a smiling user in an image. The weights and parameters may be based on historical data (e.g., previously tracked users).

In one embodiment, the AI model includes deterministic methods that have been trained with reinforcement learning (thereby creating a reinforcement learning model). The model is trained to increase the quality of the performance using measurements from tracking system 580 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told what actions to take (e.g., generating prescribed holographic content), but instead discovers which actions yield the most reward (e.g., increasing the quality of holographic content by making the user smile more) by trying them. In some cases, actions may affect not only the immediate reward but also the next situation and, through that, all subsequent rewards. These two characteristics—trial-and-error search and delayed reward—are two distinguishing features of reinforcement learning.

The AI model can include any number of machine learning algorithms. Some other AI models that can be employed are linear and/or logistic regression, classification and regression trees, k-means clustering, vector quantization, etc. In general, the LF processing engine 530 takes an input from the tracking module 526 and/or user profiling module 528 and a machine learning model creates holographic content in response. Similarly, the AI model may direct the rendering of holographic content.

Network Environment

Figure 6:
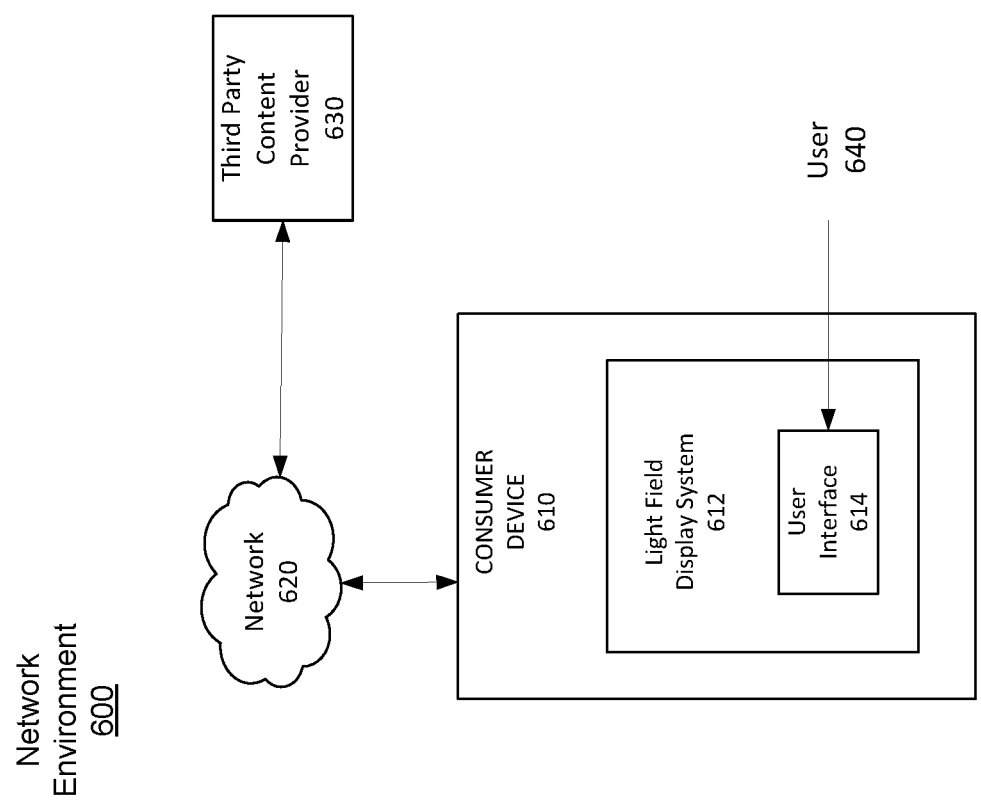
FIG. 6 is a block diagram of a network environment for a light field display system in a networked consumer device system, in accordance with one or more embodiments.

FIG. 6 depicts a block diagram of a system environment 600, in accordance with one or more embodiments. The system environment 600 comprises one or more networked consumer devices 610, a network 620, and one or more third party content providers 630.

In one embodiment, the consumer device 610 is a portable device that provides one or more consumer-oriented functionalities that are enabled by an electronic control system or a mechanical control system or a combination thereof. The networked consumer device may also execute computer program modules, for example, a web browser or client applications, which allow a user to browse the Internet, consume media content, and execute a variety of software applications in the course of using the appliance. The consumer device 610 may be, for example, a washing machine, an oven, a refrigerator, or any other network-capable consumer device. The consumer device 610 comprises a light field display system 612, and a user interface 614 in addition to the consumer related functionalities specific to the appliance. In other embodiments, the consumer device 610 comprises additional or fewer modules than those described herein. Similarly, the functions can be distributed among the modules and/or different entities in a different manner than is described here.

The LF display system 616 illustrated in FIG. 6 is an embodiment of the LF display system 500 depicted in FIG. 5. A user 640 can interact with the consumer device 610 through the user interface 614.

The network 620 may comprise any combination of local area and/or wide area networks, using both wired and/or wireless communication systems. For example, the local area network may include WiFi and Bluetooth networks. In one embodiment, the network 620 uses standard communications technologies and/or protocols. For example, the network 620 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 620 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 620 may be represented using any suitable format, such as hypertext markup language (HTML) or extensible markup language (XML). In some embodiments, all or some of the communication links of the network 620 may be encrypted using any suitable technique or techniques.

One or more third party content providers 630 may communicate with the consumer device 610 via the network 620. In one embodiment, a third-party content provider 630 may be an application provider providing applications for execution as well as content for display in the consumer device 610. New applications, new content, as well as updates to existing applications and content may be available for execution and/or display at the consumer device 610 from the third-party content provider 630 through any of a push-enabled or pull-enabled updates through the network 620. These applications and content may contain holographic content tracks be stored in the data store 522 for projection and display by the light field display system 612. Content made available to the consumer device 610 may include advertisements, product offers, and product coupons to be displayed by the light field display system 612 in association with using a functionality in the consumer device 610. For example, holographic content depicting a popular animation character may be downloaded from a third-party content provider and stored in light field display system 612 for use by user 640 as a "holographic avatar" to represent the user in one or more applications.

In one or more embodiments, in order to ensure that unauthorized network access to the consumer device 610 is prevented, the system may use security settings to authenticate network access to the consumer device 610 by an entity, for establishing a secure connection to the consumer device 610, and/or to download content to the consumer device 610. In some embodiments, the consumer device 610 may incorporate authentication factors such as passwords and smart cards, or use biometric methods to enforce access control when accessing the consumer device 610 either through the network 620 or the user interface 614. Secure access to the user interface 614 may be realized for any of the possible configurations of the user interface 614, including any of: a holographic user interface, a traditional physical user interface or audio interface which may be a part of the sensory feedback system 570, an interface which relies on gestures captured by the tracking system 580 and processed by the tracking module 526, or commands received via the network interface 524.

Holographic User Interfaces and "Touch" Interpretation in LF Display Systems

The following is a description of some embodiments of the LF display system for generating a holographic user interface (UI) for a user to interact with the consumer device. This description refers to elements illustrated in the LF display system 500 in FIG. 5.

In some embodiments, a generated holographic UI is a user interface that includes one or more holographic UI objects presented to the user. In some embodiments, the presented holographic UI objects may also be part of a virtual image display that depicts, for example, a virtual display screen image on which the holographic objects appear to reside. In some embodiments, the presented holographic objects and/or virtual images may augment a physical UI on the device. The generated holographic UI objects may include, but are not limited to, 3D holographic objects such as "buttons," "knobs," "dials," "keypads," etc. The generated holographic objects may also include 2D holographic objects such as a holographic "screen" displaying a holographic menu with a listing of numerous options. The user may be prompted (for example, verbally, or through a visually displayed prompt) to select one or more of the options by pointing to or touching a particular option in the holographic menu (for example, with their finger).

In some embodiments, the presented holographic UI objects may be augmented with tactile stimuli to generate a tactile surface that is co-located with a surface of the presented holographic object. Thus, for example, the sensory feedback system 570 may project ultrasonic energy, e.g., pressure waves, to generate a tactile surface that is collocated with a frontally displayed surface on the holographic "button." The tracking system 580 may track movement of the user (for example, movement of the user's finger) towards the holographic button. The movement information may be sent by the tracking system 580 to the tracking module 520. The tracking module 526 in the controller 520 may determine that, when the tracked finger is within some threshold distance of the presented tactile surface, the finger is "touching" or "pushing" the holographic "button." Furthermore, in response to this determination, the LF display assembly 510 may further render the holographic "button" as well as the presented tactile surface at a different location, for example, causing a location of the tactile surface to move to a new position caused by moving the holographic "button" as it is "pushed" by the user.

In another embodiment, the holographic UI may involve presenting a holographic character that greets the user. In some embodiments, various characteristics of the presented holographic character, such as visual, audio, and personality characteristics, may be configured at least in part by the user. In some embodiments, the various characteristics of the presented holographic character may be based on information received from an online system over a network, possibly in exchange for a transaction fee. In some embodiments, the holographic character may be presented along with the presentation of the holographic UI objects. In other embodiments, the holographic character may be first presented to the user, and subsequently, a holographic "menu' display with holographic UI objects may be presented. In yet other embodiments, all interactions may involve verbally spoken commands from the user that are received by acoustic receivers in the LF display system. In some embodiments, the presented holographic character may be augmented with acoustic stimuli to issue verbal responses to the user. In some embodiments, the holographic character may be generated or modified using an artificial intelligence model. In some embodiments, the holographic character may be generated based on accessed user profile data. Furthermore, as user profile information is updated, the generated holographic character may also be modified based on the modifications to the user profile information. In some embodiments, the generated holographic character may be modified based on recognized commands from the user.

In some embodiments, the tracking module 526 may track information within the holographic object volume and/or the viewing volume in front of the LF display system based on information received from the tracking system 580 and send the tracked information to the command library 532. The command library 532 may analyze the received information, use stored heuristics based on the analysis, and determine that a user interface needs to be displayed to the user. Furthermore, using the user profile information stored by the user profiling module 528, the command library 532 may apply other stored heuristics and determine from the stored mappings that a customized user interface involving the display of a particular holographic character that greets the user of the appliance needs to be generated. The command library 532 may issue a computational command to the LF processing engine 530 to display the determined holographic character greeting the user for display in the holographic object volume. Executing this computational command may involve the LF processing engine 530 acquiring image data from the data store 522 pertaining to rendering and displaying the holographic character. The command library 532 may also trigger an acoustic transducer in the sensory feedback assembly 570 to transmit an audible greeting that is in sync with the displayed holographic character. The LF processing engine 530 may use the tracking information obtained from the tracking system 580 to render the holographic character to look at and/or make eye contact, or interact in other ways with the user. Verbal responses from the user may be received by an acoustic receiving device (e.g., a microphone or microphone array) located within the sensory feedback assembly 570 which presents this received response data to the controller 520 for further processing. The command library 532 may use the data received from the sensory feedback assembly 570, apply heuristics and recognition software such as voice recognition software, and determine that, for example, a timer setting interface needs to be displayed to the user in response to the verbal utterance by the user.

In another embodiment, the user may configure the LF display system to always begin with a presentation of a particular customized 3D holographic user-interface that also is augmented with a display of particular desired appliance functionalities, such as a water heating setting options with a microwave. In some embodiments, the device user may configure settings for various appliance functionalities in association with the LF display system to have desired particular holographic user interfaces presented for use by the user with various functionalities. For example, a dryer LF display system may be configured by the user to have a specific holographic UI presented when choosing to use the dryer with a "heavy" load, to offer more selectable options than when choosing to use the dryer with a "normal" setting.

In other embodiments, the holographic user interface comprises additional or fewer functionalities than those described herein. Similarly, the functions can be distributed among the modules and/or different entities in the LF display system 500 in a different manner than is described here.

The tracking system 580 may track movement of a user using the camera within the tracking system 580. The movement of the user can be sent by the tracking system 580 to the controller 520 for touch interpretation. In some embodiments, the touch interpretation is performed as follows: the tracking system 580 first tracks user movement as the user approaches (for example, with one or more fingers) a presented holographic object. The tracking system 580 sends the tracked movement information to the controller 520. The tracking module 526 determines that the tracked finger is within a threshold distance from the presented holographic object, and in response determines that the user is "touching" the holographic object. In other embodiments, touch interpretation may involve tracking other kinds of movements with respect to presented holographic objects by the tracking system 580. Tracked movement by the user may include, but is not limited to, determining that the user is performing one or more of: changing a position, moving, pushing, pressing, dialing, rotating, typing, poking, moving a switch, etc., against one or more presented holographic objects.

In some embodiments, the sensory feedback system 570 may sense "touch" of a volumetric tactile surface augmenting a displayed holographic object. This determination may be based on receiving input from pressure sensors in the sensory feedback system 570 that detect threshold modifications caused by the presence of a finger or other body part in the ultrasonic wave energy that is required to generate the volumetric tactile surface. This information may be sent to the controller 520 for further analysis. The sense of proximity may also be achieved by monitoring the drive power applied to ultrasonic transducers required for the projection of a volumetric tactile surface, and inferring the presence of a physical object by detecting threshold changes in this drive power.

Customized Holographic Display in Consumer Devices

In some embodiments, the LF display system may use such a tracking system in combination with user profile information such as is obtained by the user profiling system 528 in FIG. 5 to generate a customized interactive experience. Thus, in a holographic UI generation application, based on the user, generated holographic "buttons" may differ in size—for example, being small for a child, and being large in size and with brighter colors that may be viewed easily by an elderly user. Furthermore, in some embodiments, the LF display system may be customized to display specific content for specific users. Thus, for example, the LF display system may be customized to display holographic "buttons" for one user and a holographic "dial" for another user. In other embodiments, the LF display module may display a customized holographic character to interact with the device user (e.g., look at, speak to, listen to, touch, or some combination thereof). Additionally, the tracking system may track the user's gaze. The tracking system may provide the gaze information to the LF display module for re-rendering the holographic content to make eye-contact with the user who is interacting with the device.

In some additional embodiments, the user profiling system may build user profiles for each of the appliance users to store user preferences or other user characteristics. The user profiles may be built with the tracking system or with another component of the LF display system such as a controller (i.e., the controller 520) and stored in a data store (i.e., the data store 530). The user profiles may be built for each user with all the data collected by the user profiling system. Additionally, other components such as a tracking system or sensory feedback assembly may provide data to the user profile to be stored in the data store.

The LF display system may utilize the user profiling system to personalize holographic content to the user during each subsequent use of the appliance. For example, the LF display system may address the user by name (e.g., visually or audio-wise). In other examples, the LF display system generates holographic content corresponding to the user's response to previously generated holographic content. For example, if Tuesday nights are regularly roast chicken night and the data store has stored this information, the LF display system in an oven may generate a holographic character to pose the query "Should I turn on the oven to 350 degrees?" when it is a Tuesday evening.

Figure 7:
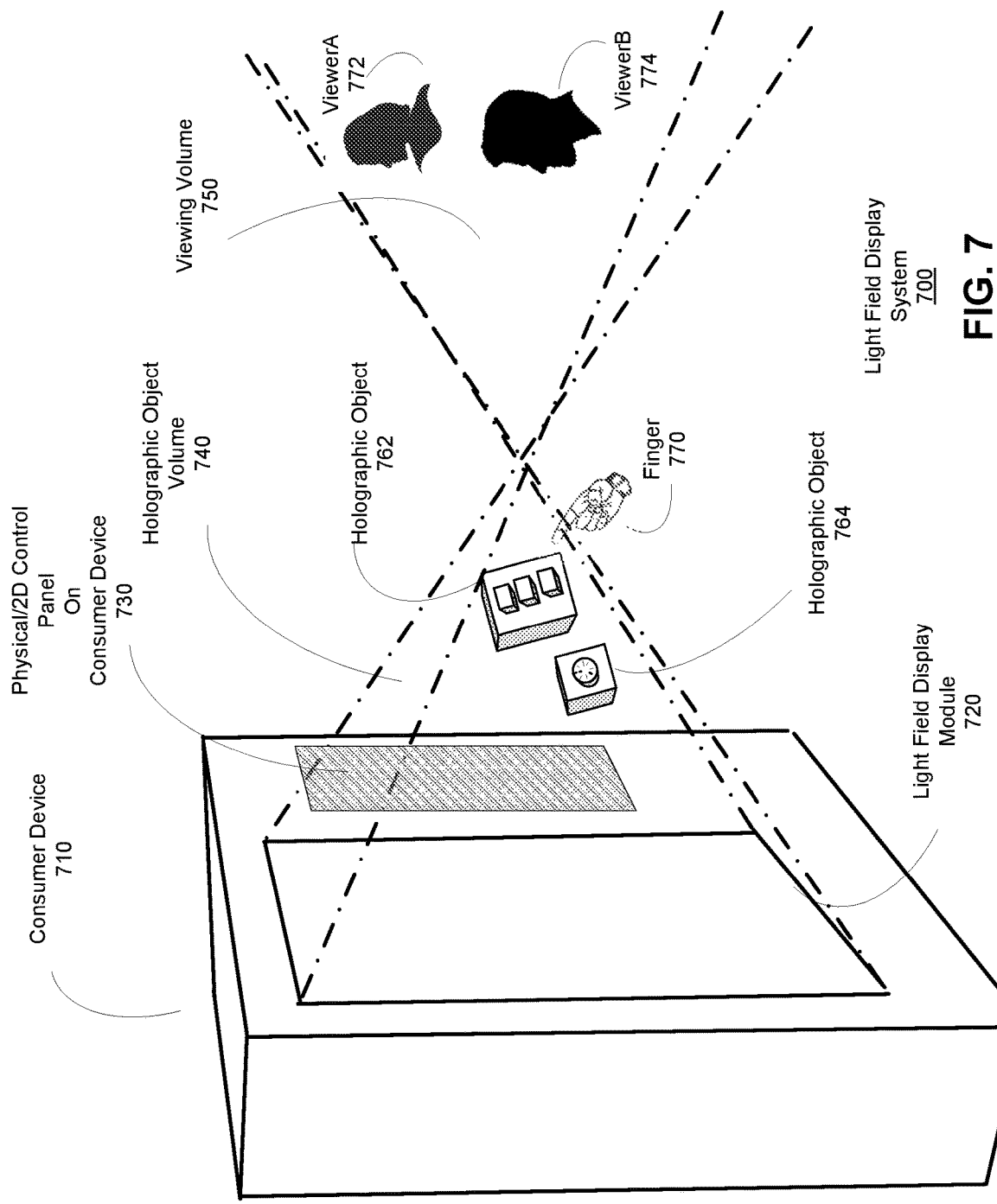
FIG. 7 is a display of an example of an embodiment of using a light field display with a consumer device.

FIG. 7 is an illustration of an embodiment of the LF display system 700 implemented as part of a consumer device 710, in accordance with one or more embodiments. The LF display system 700 is an embodiment of the LF display system 500 as described in FIG. 5. The LF display system 700 is comprised of a consumer device 710 (e.g., an appliance) with a LF display module 720. In one or more embodiments, the device 710 comes with one or more control panels 730 that may contain physical features (such as buttons, etc.) and/or 2D digital displays (including 2D touch screens) for accessing the appliance by a user. In addition, the device 710 also includes a LF display assembly (e.g., the LF display assembly 510 in FIG. 5) for generating holographic content to the user of the device. The LF display system 700 may also include any combination of the other components of the LF display system 500 shown in FIG. 5, such as the controller 520, the user profiling module 528, sensory feedback assembly 570, and the tracking system 580.

The LF display system may present holographic content including at least one holographic object to the user using one or more LF display modules. The holographic objects can be three-dimensional (3D), two-dimensional (2D), or some combination thereof. Moreover, the holographic objects may be polychromatic (e.g., full color). In FIG. 7, the holographic object volume 740 extends both in front of the display module 720 and behind it (e.g., similar to what is shown in FIG. 1). However, for ease of illustration, the portion of the holographic object volume 740 that is behind the consumer device 710 is omitted from FIG. 7. The viewing volume 750 represents the viewing space in which a user may view a presented holographic object by the LF display module 720. The holographic objects 762 and 764 can be placed anywhere within the holographic object volume 740, which encompasses all the rays of light that originate from a LF display module 720 and converge to create the holographic object, the set of convergence points being located in front of the display area of the device. Viewer A 772 and Viewer B 774 may view the displayed holographic objects 762 and 764. The displayed holographic objects 762 and 764 may be responsive to user movements. For example, holographic dials or buttons may move in response to user hand motions that may be sensed with the tracking system, rotated with user gestures which are sensed with the tracking system, rotated according to voice commands received by the sensory feedback system (e.g. 570), or with some other user input.

The holographic objects 762 and 764 may also have tactile surfaces projected to be near or coincident with their surfaces. These tactile surfaces may respond to user movement—for example, a touch on the surface may be sensed by the tracking system which may cause the sensory feedback system to trigger an appropriate tactile response (or example, the proper corresponding tactile response corresponding to a user's finger or hand location). Thus, the movement of the finger 770 towards, for example, the holographic object 762, as well as the "touch" of the finger 770 upon a tactile surface of the holographic object 762 may be established by the tracking system in the LF display system.

As described above with respect to customized holographic displays in consumer devices, when the tracking system 580 tracks the presence of Viewer A 772, the configured settings may cause a customized display of (only) holographic object 762 (i.e., the holographic "buttons") for Viewer 772. Thus, the display of holographic object 764 may not be presented if Viewer B 774 is not present. Similarly, upon sensing the presence of Viewer 774, the configured settings may cause a customized display of (only) holographic object 764 (i.e., holographic "dial") for Viewer 774.

Other exemplary embodiments of the LF display systems are described below. The description of the embodiments are added for the purpose of illustration. The description is not intended to be an exhaustive description of LF display systems within all possible appliances.

An Exemplary Embodiment: LF Display System in a Home Assistant

The following is a description of some embodiments of the LF display system as part of a home assistant device (such as ALEXA from AMAZON and HOME from GOOGLE). This description refers to elements illustrated in the LF display system 500 in FIG. 5. Such home assistant systems may also double as home automation systems which can control home lighting, home climate, home entertainment systems, appliances, cameras, door locks, or other devices.

In some embodiments, the sensory feedback system 570 may receive sensory data detected in the vicinity of the device (e.g., audio data such as a spoken command from a user captured by an acoustic microphone in the sensory feedback system 570) or the tracking system 580 may receive visual information regarding user movement captured by a camera. This received information is sent to the controller 520 within the light field display system 500 in the home assistant. The controller 520 may forward this information to the command library 532 for further processing and interpretation. The command library 532 may interpret the received information, along with user profile information stored by the user profiling system 528, in conjunction with the tracking module, if necessary, for interpreting user gestures, apply stored heuristics, and send a computational command to the LF processing engine to present a holographic user interface as described above to the user.

The displayed holographic user interface may be configured as desired by the user for ease of interaction with the home assistant. The holographic user interface presented to the user is integrated with the home assistant to enable the display and execution of all functionalities provided by the home assistant. Examples of the functionalities provided by the LF display system 500 integrated with a home assistant include, but are not limited to, the holographic user interface including a holographic and tactile screen of menu choices displayed to the user that responds to a touch command from the user, and a holographic display of a home's security, lighting or home appliance settings that facilitate reconfiguring these settings by the user through the displayed holographic interface.

The holographic user interface to a consumer device (e.g. home assistant) may feature a holographic character, as previously described. A holographic character may have a variety of characteristics which may be changed to taste, including any of: appearance (e.g. appearance of a celebrity), clothing (or none), personality, voice (e.g. accent or the voice of a celebrity), temper, language (e.g. amount of curse words used), or other traits. The holographic character may have the appearance of a CG character (e.g. a superhero), a famous personality such as an actor or an athlete, a random selection of one of many available avatars, or another appearance. The appearance of a holographic character may be accompanied by a home assistant voice which is recognizable (e.g. a celebrity voice to match the appearance) and may be changed readily by the user. The holographic character may be generated and personalized by an AI model. The holographic character may also access a user profile or a social media account in order to make it more appealing to the user. For example, the holographic character may provide playful feedback based on observed characteristics in photos or discussions that appear on the user's social media accounts, or offer banter based on calendar reminders on the day of a scheduled event. For amusement to a user, the holographic character may be put into a bad mood or a pleasant mood, depending on the selection of the user. Many choices for traits of holographic characters to be viewed and experienced on a consumer device such as a home assistant or home automation device may be downloadable via the network 620 via a third-party content provider 630 such as an online store, in some cases in exchange for a transaction fee.

In other embodiments, the home assistant holographic character may be provided as a virtual pet which may be affectionate to recognized users, or behave as a watch animal (guard dog or boisterous parrot) which behaves in a protective manner when an unrecognized person is observed in portions of the home.

An Exemplary Embodiment: LF Display System in an Oven

The following is a description of some embodiments of the LF display system as part of a consumer appliance such as a household oven. This description refers to elements illustrated in the LF display system 500 in FIG. 5.

In some embodiments, within the light field display system 500 in the appliance, the tracking module 526 may receive images captured in front of the LF display system (e.g., within the holographic object volume and/or within the viewing volume, etc.) from the tracking system 580. The tracking module 526 may determine the presence of a user. The command library 532 in the controller 520 may use the tracked information received from the tracking module 526, along with user profile information stored by the user profiling system 528, to apply heuristics to send a computational command to the LF display assembly 510 to present a holographic user interface as described above to the user.

As noted previously, in some embodiments, the LF display system 500 may also augment the presented holographic content with other sensory content (e.g., touch, temperature). Thus, for example, the LF display system 500 associated with an oven may present a holographic image of a loaf of bread baking in the oven. The holographic "loaf" may be augmented with tactile stimuli to generate a tactile surface that is co-located with the top surface of the presented holographic "loaf." Thus, the sensory feedback system 570 may project acoustic energy, e.g., pressure waves, to generate the co-located tactile "loaf" surface. Furthermore, the quality of the co-located tactile "loaf" surface may be periodically modified so that the sensation of touch presented to the user reflects the state of the "done-ness" of the actual baking loaf within the oven.

Thus, in some embodiments, the LF display system may obtain parameter values such as time, temperature etc. from the appliance control system, and use the parameter values along with data in the data store 522 regarding baking time for a loaf of bread to adjust the strength of the presented tactile surface, such that the presented strength of the surface may depict "done-ness" of the loaf in the appliance. For example, the LF display system may use the obtained information to control the ultrasonic emitters in the sensory feedback assembly 570 to generate suitably changing pressure waves such that the strength of the rendered tactile surface at a given point in time responds to "touch" from the user to reflect the "done-ness" of the actual loaf in the oven at a given time.

In some embodiments, the tracking system 580 may track movement of the user (for example, movement of the user's finger) towards the presented holographic loaf. The movement information may be sent by the tracking system 580 to the controller 520. The controller 520 may determine that, when the tracked finger is within some threshold distance of the presented tactile loaf surface, the finger is "touching" or "pushing" the holographic "loaf." Furthermore, in response to this determination, the LF display assembly 510 may further render the holographic "loaf" as well as the presented tactile surface at a different location, for example, causing a location of the tactile surface to move to a new position caused by moving the holographic "loaf" as it is "pushed" by the user. Again, the amount of movement of the "surface" to the new position may reflect the "done-ness" of the loaf.

Some embodiments may employ input from the sensory feedback assembly 570 to determine how to display holographic objects. The display of the holographic objects may be modified in response to receiving a value of a parameter at the LF display system 500. Examples of parameters may include time, temperature, pressure, force, audio decibel level, etc., or some combination thereof. For example, a roasting turkey may be depicted as a holographic object that slowly changes color as the roasting time progresses within the oven, based on a timer or temperature sensor input. In another embodiment, where the LF display system 500 is equipped with heating units as part of the sensory feedback assembly 570, the temperature around a holographic representation of a roasting turkey may be raised as time or temperature increases. Data may be obtained from additional sensors located within the oven (such as temperature sensors) as well as obtained from data stored within the data store (such as recipe information), in order to generate the holographic object.

In some embodiments, the operational choices made by the user may affect the display of the holographic content. For example, when the LF display system determines that the user has made an operational choice of using the oven on a low-temperature 10-hour cycle, the LF display system may present a holographic depiction of the oven contents only at the end of the 10-hour cycle.

An Exemplary Embodiment: LF Display System in a Refrigerator

Some embodiments of the LF display system are found in appliances such as a household refrigerator. In some embodiments, the tracking module 526 may (as shown in FIG. 5) track information within the holographic object volume and/or the viewing volume in front of the LF display system based on information received from the tracking system 580 and send this tracked information to the command library 532. The command library 532 uses the tracked information received from the tracking module 526 along with user profile information stored by the user profiling system 528, applies heuristics in the command library 532 and sends a computational command to the LF processing engine 530. The LF processing engine 530 executes the computational command and causes the LF display assembly to project a holographic display of the contents of the refrigerator. In some embodiments, displaying the contents of the refrigerator involves internal camera sensors located within the refrigerator in order to provide image data of the refrigerator contents to the LF display system 500. In other embodiments, the LF display system 500 receives user commands, either entered manually on a physical control panel by the user, or based on recognition of user gestures by the tracking system 580, to generate the holographic display. For example, the tracking module 526 detects user gestures that are mapped based on heuristics by the command library 532 to send a computational command to the LF display system to generate a holographic display that depicts just a portion of the refrigerator contents (such as, for example, the amount of ice currently available through the built-in icemaker in the freezer, or as another example, the contents of the refrigerator door shelves). Following the example, generating the desired particular holographic display may involve using the camera sensors within the sensory feedback system 570 to acquire desired image data, and render the holographical objects projected from the display surface based on the acquired images.

It has been noted previously that in some embodiments, the LF display system may include elements that enable the system to simultaneously emit at least one type of energy, and, simultaneously, use image tracking information as well as image information from within the appliance for the purpose of responding to the user and for creating an interactive experience for the user. Thus, for example, in one embodiment, the LF display system 500 may display the contents of a refrigerator. Upon sensing that the user "moves" a particular depicted holographic object such as, for example, a gallon of milk, the system may modify the presentation to depict a different holographic object, for example, a bag of salad greens that resides behind the gallon of milk within the refrigerator.

Appliance Service and Maintenance Support

Additional embodiments using the LF display system involve facilitating service and maintenance functionalities within a consumer device (e.g. an appliance). The LF display system may have access control policies in place to permit display of only certain types of holographic objects on the consumer device user under normal operation of the consumer device. However, a licensed consumer device service technician may obtain secure access within the consumer device system to activate display of holographic objects that depict internal mechanical elements within the consumer device during service maintenance and/or repair of the consumer device (e.g. an appliance such as a dish washer). This display may be generated using a variety of sensor data derived from sensors located within the consumer device. Thus, for example, a licensed refrigerator technician may be able to securely enable a holographic display of a refrigerator's ice maker, including the internal mechanical parts that are not readily visible to the user of the refrigerator, such as for example, a condenser fan and motor assembly, water tubing, ice cutting grid assembly, etc., as well as the circuitry associated with the refrigerator's ice maker, while performing service or maintenance tasks directed at the ice-making capabilities of the refrigerator.

Figure 8:
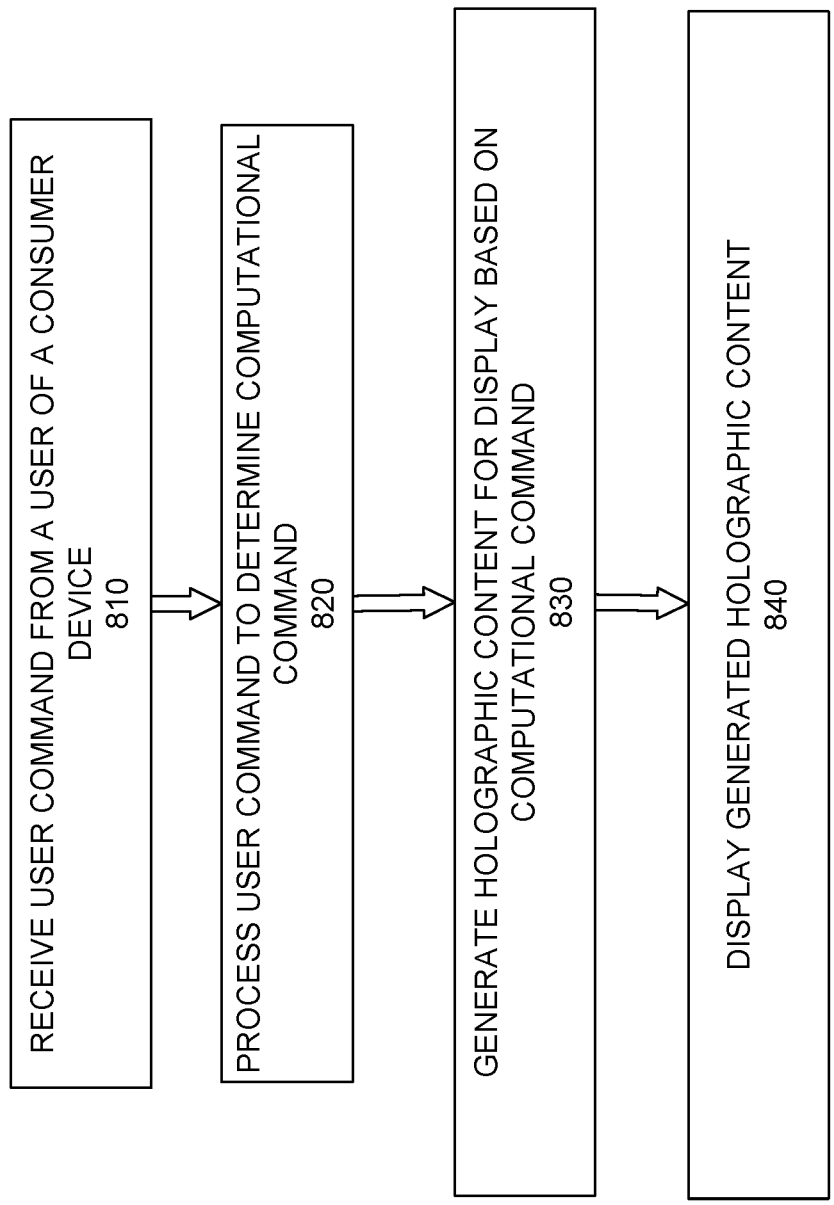
FIG. 8 is a flowchart illustrating a method for enabling interaction with a consumer device using a light field display system, in accordance with one or more embodiments.

FIG. 8 is a flowchart illustrating a process for enabling user interactions with a consumer device using a light field display system, in accordance with one or more embodiments. In one embodiment, the process of FIG. 8 is performed by the light field display system 500 (as shown in FIG. 5). Other entities may perform some or all of the steps of the process in other embodiments. Likewise, embodiments may include different and/or additional steps, or perform the steps in different orders.

The light field display system 500 receives 810 a command from the user. The user command may be received through physical controls, for example, physical buttons that may be pressed, physical dials that may be rotated, and physical touch-enabled screens, that may all be located on the consumer device and be part of the sensory feedback system 570. In another example, user commands may be received as voice commands at acoustic receivers such as acoustic microphones that are part of the sensory feedback system 570. The received user command is relayed to the command library 532 via the controller for further interpretation and analysis. The user command may also be received through holographic object interaction by the user, such as with a displayed holographic UI. The user command may also be received through the tracking system 580 that is tracking a user via instructions from the tracking module 526. The user command may be received when the tracking system 580 detects that a user has touched a tactile holographic surface, such as a holographic "button" on the displayed holographic UI. The received user command is relayed to the command library 532 via the controller for further interpretation and analysis. Similarly, a user command may be in the form of gestures or movements made by the user. The user movement or gesture may be identified by the tracking system 580 and may be relayed to the command library 532 for analysis and interpretation. User commands may also be received over a communications network at the consumer device and sent to the command library 532 for analysis and interpretation.

The light field display system 500 processes 820 the user command to determine a computational command. The command library 532 in the light field display system 500 interprets the received user command, possibly in association with user profile information stored by the user profiling system 528, in conjunction with the tracking module, if necessary, for interpreting user gestures, may apply stored heuristics, and determines a computational command based on the received user command. One example of a determined computational command is a command to generate more holographic content for display by the user of the consumer device. Another example may be to modify generated holographic content. The determined computational command may activate sensors in the LF display system, such as, for example, imaging sensors for tracking the user's gaze. The determined computational command may also activate controls within the consumer device. For example, a computational command may decrease a temperature setting in a refrigerator.

The light field display system generates 830 holographic content for display based on the computational command. The LF processing engine 530 in the light field display system 500 receives the determined computational command from the command library 532, and generates 830 the holographic content for display based on the computational command. Thus, for example, the computational command may direct the LF processing engine 530 to generate a holographic display of a loaf of bread baking in the oven. In response, the LF processing engine 530 may first determine characteristics of the holographic display, such as the color and tactile features of the depicted loaf, to depict "doneness" of the baking loaf, obtain stored user profile characteristics from the data store 522, etc., before generating the required holographic content.

The light field display system 500 displays 840 the generated holographic content. The controller 520 sends display instructions to project holographic content from the LF processing engine 530 to the LF display module 512. The LF display module 512 displays the holographic content to the user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A consumer device comprising:
a light field (LF) display system comprising:
  a controller configured to generate holographic content;
  an LF display assembly comprising one or more LF display modules that are configured to present the generated holographic content to a user of the consumer device; and
  a command interface configured to recognize one or more commands from the user,
  wherein the LF display assembly comprises:
    an energy device layer comprising one or more displays operable to project modulated energy;
    a waveguide layer operable to direct the modulated energy from a plurality of energy source locations on an energy surface along different propagation paths to a plurality of points of convergence in space that form holographic representations of objects in the holographic content, each of the different propagation paths being determined based on the respective energy source location on the energy surface.

2. The consumer device of claim 1, wherein the controller is configured to update the generated holographic content in response to a change in an operating state of the consumer device.

3. The consumer device of claim 1, wherein the generated holographic content comprises a holographic user interface (UI) with one or more holographic features to control an operation of the consumer device, and wherein the command interface is further configured to recognize the one or more commands received from the user through the generated holographic UI.

4. The consumer device of claim 3, wherein the command interface is further configured to receive a command from the user through the holographic UI based on determining that the user is within a threshold distance of the one or more holographic features in the presented holographic UI.

5. The consumer device of claim 1, wherein the one or more recognized commands cause a change in an operating state of the consumer device.

6. The consumer device of claim 1, wherein the controller is further configured to modify holographic content based on one or more recognized commands from the user.

7. The consumer device of claim 1, wherein the controller is further configured to:

retrieve at least a part of the holographic content from an online system over a network interface in a vectorized format; and
convert the vectorized format of the holographic content into a rasterized format for presentation by the LF display assembly.

8. The consumer device of claim 1, wherein the LF display system is configured to modify the presentation of the holographic content based on environmental characteristics at a location where the holographic content is presented to the user.

9. The consumer device of claim 1, wherein the LF display system is configured to modify the presentation of the holographic content based on a value of a parameter received at the LF display system.

10. The consumer device of claim 1, the LF display system further comprising:
a security module comprising an authentication module that is configured to:
  receive security credentials from a user; and
  authenticate the received security credentials;
  enable secure access to one or more functionalities of the consumer device; and
  enable the generation of particular holographic content in response to the authentication.

11. The consumer device of claim 10, wherein the security module is further configured to:
receive data captured by internal sensors within the consumer device; and
provide the received data to the controller.

12. The consumer device of claim 11, wherein the controller is configured to generate the holographic content based on the received data from the internal sensors.

13. The consumer device of claim 12, wherein the controller is configured to generate the holographic content in part using an artificial intelligence model.

14. A light field (LF) display system comprising:
a controller configured to generate holographic content;
an LF display assembly comprising one or more LF display modules that are configured to present the generated holographic content to a user; and
a command interface configured to recognize one or more commands from the user,
wherein the LF display assembly comprises:
  an energy device layer comprising one or more displays operable to project modulated energy;
  a waveguide layer operable to direct the modulated energy from a plurality of energy source locations on an energy surface along different propagation paths to a plurality of points of convergence in space that form holographic representations of objects in the holographic content, each of the different propagation paths being determined based on the respective energy source location on the energy surface.

* * * * *